United States Patent
Kakui et al.

(10) Patent No.: US 7,436,583 B2
(45) Date of Patent: Oct. 14, 2008

(54) OPTICAL AMPLIFICATION FIBER, OPTICAL AMPLIFIER MODULE, OPTICAL COMMUNICATION SYSTEM AND OPTICAL AMPLIFYING METHOD

(75) Inventors: Motoki Kakui, Yokohama (JP); Tetsuya Haruna, Yokohama (JP); Shinji Ishikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 175 days.

(21) Appl. No.: 10/933,473

(22) Filed: Sep. 3, 2004

(65) Prior Publication Data

US 2005/0122574 A1 Jun. 9, 2005

(30) Foreign Application Priority Data

Sep. 5, 2003 (JP) ............ P2003-314353

(51) Int. Cl.
*H01S 3/00* (2006.01)
*H01S 3/10* (2006.01)
*H04B 10/12* (2006.01)

(52) U.S. Cl. .......... 359/341.1; 398/160; 385/122; 385/123

(58) Field of Classification Search ......... 359/341.1; 398/122–3, 160; 385/122–123
See application file for complete search history.

(56) References Cited

U.S. PATENT DOCUMENTS

| | | | |
|---|---|---|---|
| 5,732,178 A * | 3/1998 | Terasawa et al. | 385/127 |
| 5,818,630 A | 10/1998 | Fermann et al. | |
| 5,963,361 A * | 10/1999 | Taylor et al. | 359/337 |
| 6,396,624 B1 * | 5/2002 | Nissov et al. | 359/341.1 |
| 6,477,297 B1 * | 11/2002 | DeMeritt et al. | 385/32 |
| 2002/0081085 A1 * | 6/2002 | Endo et al. | 385/123 |
| 2004/0264896 A1 * | 12/2004 | Takahashi et al. | 385/103 |

FOREIGN PATENT DOCUMENTS

| | | |
|---|---|---|
| JP | 2000-031571 | 1/2000 |
| JP | 3228374 | 9/2001 |

OTHER PUBLICATIONS

Fermann, M. E. "Single-mode excitation of multimode fibers with ultrashort pulses", Optics Letters, vol. 23, No. 1, Jan. 1, 1998, pp. 52-54.

Mizuochi, T. et al., "All-fiber add/drop multiplexing of 6×10 Gbit/s using a photo-induced Bragg grating filter for WDM networks", OFC '96, Feb. 25-Mar. 1, 1996, Technical Digest Series, WF2, pp. 116-117.

(Continued)

*Primary Examiner*—Eric Bolda
(74) *Attorney, Agent, or Firm*—McDermott Will & Emery LLP

(57) ABSTRACT

The present invention relates to an optical amplification fiber and others capable of effectively reducing nonlinear interaction between signal channels even in transmission of multiplexed signal light containing multiple signal channels arranged in high density and also effectively reducing bending loss. An optical amplification module has an optical isolator, a WDM coupler, an Er-doped optical fiber (EDF) as an optical amplification fiber, a WDM coupler, and an optical isolator, which are arranged in order on a signal light propagation path from an input connector to an output connector, and further has a pumping light source connected to the WDM coupler and a pumping light source connected to the other WDM coupler. The EDF, at the wavelength of 1607 nm, has a mode field diameter (MFD) of 10 μm or more to the fundamental mode and a MAC number (=MFD/cutoff wavelength) of 6.8 or less to the fundamental mode.

24 Claims, 23 Drawing Sheets

OTHER PUBLICATIONS

Aiso, K. et al., "Design optimization of index profile for L-band Erbium doped fiber", Seventh Optoelectronics and Communications Conference (OECC 2002) Technical Digest; Pacifico Yokohama, Yokohama; Jul. 2002, pp. 62-63.

Amemiya, K. et al., "25 GHz-spaced 10 Gbps×136 Channels WDM Transmissions over NZ-DSF in C-band with Wavelength Grouping", Fujitsu Labroatories Ltd. The Institute of Electronics, Information and Communication Engineers, 2003.

* cited by examiner

*Fig.2*

| PARAMETER | UNITS | A | B | C |
|---|---|---|---|---|
| CORE DIAMETER | μm | 18.4 | 14.5 | 5 |
| MFD | μm | 13.3 | 10.8 | 6.15 |
| CUTOFF WAVELENGTH | μm | 5.2 | 4.3 | 1.39 |
| NUMBER OF PROPAGATION MODES | - | 33 | 22 | 1 |
| MAC NUMBER | - | 2.6 | 2.5 | 4.4 |
| Er CONCENTRATION | wt·ppm | 1500 | 1300 | 1400 |
| $\alpha_{1.53}$ | dB/m | 43 | 31 | 19 |
| DISPERSION VALUE | ps/nm/km | 10 | 10 | 12 |
| $\eta_0$ | | 1.7E-10 | 7.6E-10 | 1.3E-08 |
| Relative $\eta_0$ | dB | -18.9 | -12.5 | 0 |

OPTICAL AMPLIFICATION FIBER, OPTICAL AMPLIFIER MODULE, OPTICAL COMMUNICATION SYSTEM AND OPTICAL AMPLIFYING METHOD

BACKGROUND OF THE INVENTION

1. Field of the Invention

The present invention relates to an optical amplification fiber capable of amplifying light, an optical amplification module including the optical amplification fiber, an optical communication system including the optical amplification module, and an optical amplification method using the optical amplification module.

2. Related Background Art

The required transmission capacity of optical communication systems is increasing, so as to inevitably lead to increase in the number of signal channels in the Wavelength Division Multiplexing (WDM) optical transmission which is the mainstream at present. However, the increase in the number of channels without change of the conventional channel spacing (wavelength spacing) will result in expanding a necessary signal wavelength bandwidth and it can exceed the optical amplification band of Er-doped fiber amplifiers (EDFAs) as the optical amplification technology available at present. On the other hand, a seek for higher density of signal light by halving the channel spacing from 100 GHz of the conventional ITU grid to 50 GHz and further to 25 GHz is a desired approach from the viewpoint of increasing the transmission capacity while keeping the conventional width of the optical amplification band.

For achieving a high density of signal light, however, there is concern about degradation of signal quality due to enhancement of nonlinear interaction between signal channels as typified by four wave mixing (FWM). Efficiency $\eta$ of generation of a conjugate wave in FWM is approximated by Formula (1) below and, where the channel spacing $\Delta\lambda$ is halved, the generation efficiency $\eta$ is expected to be up to sixteen times (12 dB on a decibel basis).

$$\eta \propto \frac{1}{\alpha^2 (MFD)^4 D^2 (\Delta\lambda)^4}. \quad (1)$$

In the formula $\alpha$ represents an absorption coefficient in the case of fibers for transmission, or an unsaturated absorption peak per unit length in the case of fibers for optical amplification. For example, in the case of an Er-doped optical fiber (EDF), $\alpha$ is determined by an Er dopant concentration, an overlap between an Er-doped region and a signal light mode field, and an absorption cross section of Er ions determined by a glass composition. Furthermore, MFD (Mode Field Diameter) is a mode field diameter for the fundamental mode of signal light, D chromatic dispersion, and $\Delta\lambda$ the channel spacing. Since only $\Delta\lambda$ is a parameter dependent on setting on the signal light source side, $\eta_0$ represented by Formula (2) below is introduced for convenience sake of purely comparing characteristics of EDF.

$$\eta_0 = \frac{1}{\alpha^2 (MFD)^4 D^2}. \quad (2)$$

Only MFD has the same order as $\Delta\lambda$ in above Formula (1) (or above Formula (2)), and expansion of MFD is the most effective in decreasing $\eta$. It is pointed out that this phenomenon occurs not only in the transmission fibers, but also inside optical fiber amplifiers such as EDFAs (Erbium-Doped Fiber Amplifiers) used as repeaters. This tendency is prominent, particularly, in L-band EDFAs necessitating a long EDF.

For decreasing $\eta$ in above Formula (1) (or $\eta_0$ in above Formula (2)), the simplest technique independent of the other parameters is to increase the Er concentration as in Embodiment 1 or 3 of Document 1 (Japanese Patent Application Laid-Open No. 2000-31571). However, too high Er concentrations actualize a phenomenon in which Er ions exchange energy with each other to become not engaged in optical amplification (so called concentration extinction), so as to decrease pumping efficiency.

Other proposed techniques for decreasing $\eta$ in above Formula (1) (or $\eta_0$ in above Formula (2)) include increase of the core diameter, expansion of the outer diameter of the Er-doped region, expansion of MFD, design of the refractive index profile to increase chromatic dispersion, and so on as suggested in Document 1 or in Document 2 (Japanese Patent No. 3228374).

In addition, Document 3 (M. E. Fermann, "Single-mode excitation of multimode fibers with ultrafast pulses," Optics Letters, Vol. 23, No. 1, p. 52, 1998) discloses the technology using a mode converter comprised of a complex lens system for input of single-mode signal light into a multimode optical amplification fiber. The propagatable length of the fundamental-mode light in this multimode optical amplification fiber is set to the length where the coupling efficiency to a higher-order mode is $1/e^2$, and the propagatable length is approximately 3 m even under such less-restricted standard. The propagatable length of the fundamental-mode light in the multimode optical amplification fiber as described in Document 4 (U.S. Pat. No. 5,818,630) is at most 1.1 m.

SUMMARY OF THE INVENTION

Inventors studied the conventional optical amplification fibers and found the following problems. Namely, as apparent from above Formula (1), only MFD has the same order as the channel spacing $\Delta\lambda$, and the expansion of MFD is the most effective in decrease of $\eta_0$. However, forgoing Document 1 and Document 2 include only Embodiment 3 of Document 1 and Embodiment 2 of Document 2 as configurations to expand MFD. The reason for it is that the expansion of MFD with the cutoff wavelength being kept shorter than all the signal light wavelengths as in all the above conventional technologies will result in increasing MAC (=MFD/cutoff wavelength) and actualizing an increase of bending loss.

The multimode optical amplification fibers described in above Document 3 and Document 4 have the too large core diameters of 45-50 µm, and they fail to secure the length enough to earn a sufficient amplification gain for L-band signal light.

The present invention has been accomplished in order to solve the problems as described above, and an object of the present invention is to provide an optical amplification fiber, an optical amplification module, an optical communication system, and an optical amplification method with a structure capable of reducing the nonlinear interaction between signal channels even in signal light including multiple signal channels arranged in high density with the optical frequency spacing of 25 GHz or less (multiplexed signal light in which multiple signal channels are multiplexed) and also reducing the bending loss.

An optical amplification fiber according to the present invention is an optical fiber capable of amplifying light, which has a mode field diameter of 10 μm or more with respect to the fundamental mode and a MAC number of 6.8 or less with respect to the fundamental mode, as characteristics at the longest wavelength in an optical amplification band (1607 nm on the assumption that an L-band signal is amplified). This configuration permits the optical amplification fiber to effectively reduce the nonlinear interaction between signal channels and also to effectively reduce the bending loss, even in cases where multiplexed signal light with signal channels arranged in high density propagates therein.

The optical amplification fiber according to the present invention preferably comprises an Er-doped region having an outer diameter larger than the mode field diameter but smaller than twice the mode field diameter. In this case, the unsaturated absorption is high enough to suppress degradation of pumping efficiency. The outer diameter of core region is also preferably larger than the mode field diameter but smaller than twice the mode field diameter. In this case, it becomes feasible to achieve high resistance to the bending loss and to increase the mode field diameter.

The optical amplification fiber according to the present invention is preferably a multi-mode optical amplification fiber wherein the number of propagatable transverse modes is 2 or more but 40 or less in the entire optical amplification band. In this case, the fiber can reduce the nonlinear interaction well and will cause no inconvenience when mounted in practice.

The optical amplification fiber having the structure as described above is applicable to an optical amplification module for amplifying signal light inputted from an input end and for outputting the amplified signal light from an output end (an optical amplification module according to the present invention). In this case, the optical amplification module comprises the optical amplification fiber having the structure as described above (the optical amplification fiber according to the present invention), as a first optical amplification fiber constituting at least a part of a signal light propagation path located between the input end and the output end. In the optical amplification module, the signal light is amplified in the first optical amplification fiber, so that the nonlinear interaction between signal channels can be effectively reduced.

Preferably, the optical amplification module according to the present invention further comprises a second optical amplification fiber constituting at least a part of the signal light propagation path located between the input end and the output end, and having a cutoff wavelength shorter than the shortest wavelength in the optical amplification band (the wavelength of 1607 nm) with respect to the fundamental-mode light. This second optical amplification fiber is preferably placed on the light entrance end side of the first optical amplification fiber. In this case, the signal light is amplified by the both first and second optical amplification fibers, and it is thus feasible to effectively reduce the nonlinear interaction between signal channels and to effectively suppress degradation of pumping efficiency. The optical amplification module according to the present invention may also have a configuration wherein the second optical amplification fiber comprises two optical fibers arranged one on the light entrance end side and the other on the light exit end side of the first optical amplification fiber. In this case, it is further feasible to effectively suppress degradation of noise figure.

In the optical amplification module according to the present invention, the first optical amplification fiber may be an Er-doped optical fiber. The second optical amplification fiber may also be an Er-doped optical fiber. In this case high pumping efficiency is achieved.

In the optical amplification module according to the present invention, preferably, a core region in the first optical amplification fiber has a refractive index profile with a maximum at a position a predetermined distance away in the radial direction from a center. In this case, it is feasible to expand the mode field diameter of the first optical amplification fiber and thus to adequately reduce the nonlinear interaction between signal channels. The optical amplification module according to the present invention may comprise a connection fiber placed between the first optical amplification fiber and the second optical amplification fiber. A core region of this connection fiber preferably has an outside diameter nearly equal to a core diameter of the first optical amplification fiber and has a refractive index profile with a maximum at a center. In this case it is feasible to decrease fusion splice loss.

The optical amplification module according to the present invention may further comprise a single-mode fiber fusion-spliced to at least one side of the light entrance end and the light exit end of the first optical amplification fiber. In this case, the splice loss due to the fusion splice is preferably 0.3 dB or less. In addition, a change of the splice loss between these first optical amplification fiber and single-mode fiber is preferably 0.2 dB or less in a temperature range of −5 to +65° C.

In the optical amplification module according to the present invention, preferably, the first optical amplification fiber and the single-mode fiber are fusion-spliced under a condition that a product of a heating time and a heating power is equal to or smaller than a product of a heating time and a heating power in fusion splice between single-mode fibers. Specifically, the heating time in the fusion splice between the first optical amplification fiber and the single-mode fiber is preferably approximately two thirds of the heating time in the fusion splice between single-mode fibers, in order to enable implementation of a practical, simple configuration and facilitate production.

In the optical amplification module according to the present invention, preferably, a crosstalk occurring at a fusion-spliced portion between the first optical amplification fiber and the single-mode fiber is 0.6% or less per spliced portion in terms of a power ratio. Another preferred configuration is such that the single-mode fiber comprises two optical fibers fusion-spliced one to the light entrance end and the other to the light exit end of the first optical amplification fiber, and a crosstalk between a light component to be converted into a higher-order mode at the light entrance end of the first optical amplification fiber and converted into the fundamental mode at the light exit end and a light component to propagate in the first optical amplification fiber while maintaining the fundamental mode, is 45 dB or more in terms of a power ratio.

In the optical amplification module according to the present invention, preferably, the first optical amplification fiber has a length enough to earn an L-band gain. Specifically, the first optical amplification fiber preferably has a length equivalent to an unsaturated absorption of 320 dB. In the optical amplification module according to the present invention, the first optical amplification fiber preferably has an unsaturated absorption peak per unit length of 17.2 dB/m or more.

An optical communication system according to the present invention comprises a configuration in which the optical amplification module having the structure as described above is placed on a signal light transmission path. This optical amplification module amplifies signal light of multiple channels with the optical frequency interval between two mutually adjacent channels being 25 GHz or less, in the middle of propagation through the optical transmission path. This optical communication system has high optical frequency utilization efficiency and reduces the nonlinear interaction between signal light channels.

An optical amplification method according to the present invention is an optical amplification method of amplifying a signal of multiple channels of mutually different wavelengths by use of the optical amplification module having the structure as described above, wherein a total signal light input power into the first optical amplification fiber is set to be +10 dBm or more. In this case, it is feasible to effectively reduce the nonlinear interaction between signal channels and to effectively suppress degradation of pumping efficiency.

Each of embodiments according to the present invention can be further fully understood in view of the following detailed description and accompanying drawings. These embodiments are presented for illustrative purposes only and are not to be considered as limiting the present invention.

The scope of further application of the present invention will become apparent from the following detailed description. It is, however, noted that the detailed description and specific examples will describe the preferred embodiments of the present invention and are presented for illustrative purposes only, and it is apparent that various modifications and improvements within the spirit and scope of the present invention are obvious to those skilled in the art from the detailed description.

BRIEF DESCRIPTION OF THE DRAWINGS

FIG. 2 is a table showing a list of specifications of each of EDFs (types A and B) prepared as fibers for optical amplification according to the present invention and an EDF (type C) as a comparative example;

DETAILED DESCRIPTION OF THE PREFERRED EMBODIMENTS

Embodiments of the optical amplification fiber, the optical amplification module, the optical communication system, and the optical amplification method according to the present invention will be described below in detail with reference to FIGS. 1 to 23. The same elements will be denoted by the same reference symbols throughout the description of the drawings, without redundant description.

Figure 1:
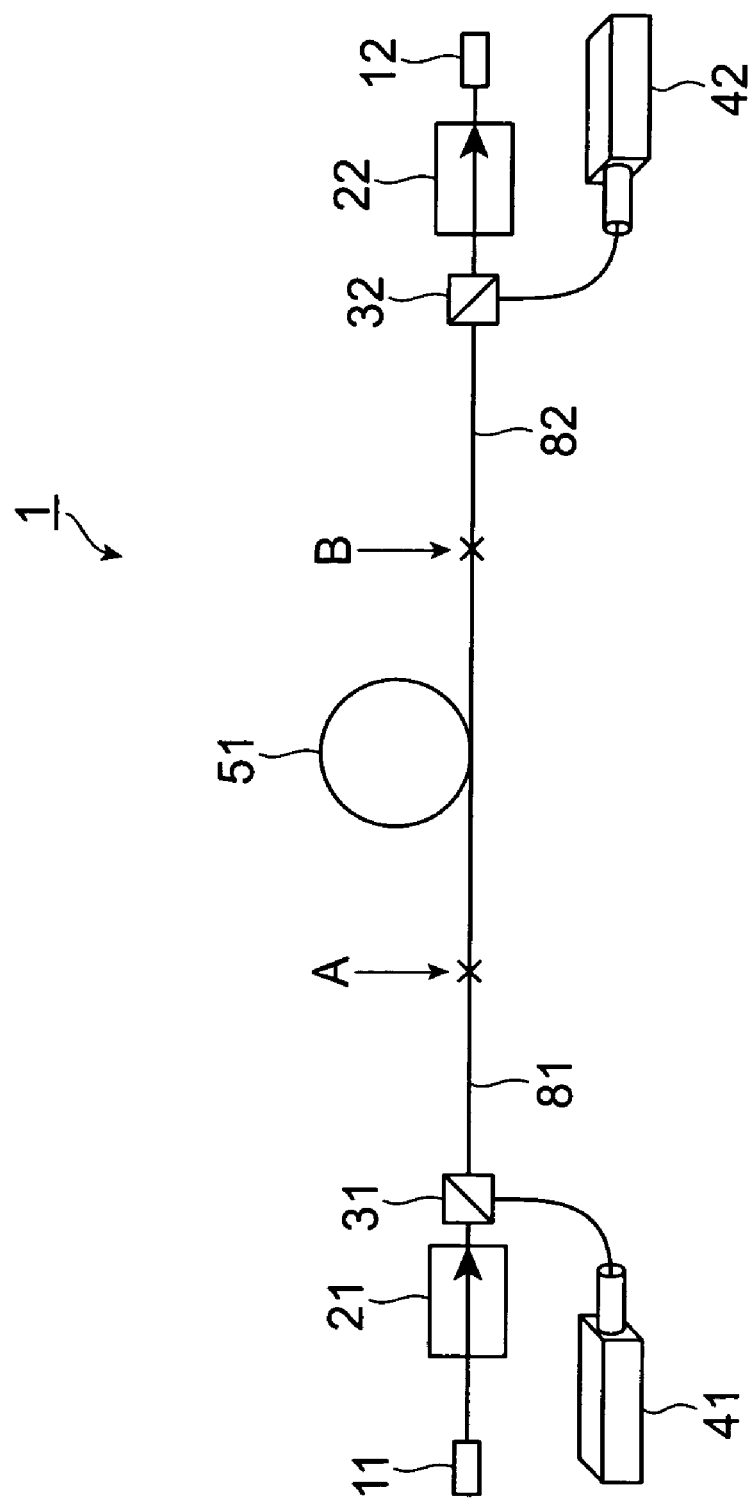
FIG. 1 is an illustration showing a configuration of a first embodiment of an optical amplification module according to the present invention.

FIG. 1 is an illustration showing a configuration of the first embodiment of the optical amplification module according to the present invention. In this FIG. 1, the optical amplification module 1 of the first embodiment amplifies signal light (multiplexed signal light in which multiple signal channels are multiplexed) in the C-band or in the L-band inputted through an input connector 11 being an input end, and outputs the amplified signal light to the outside (transmission fiber) through an output connector 12 being an output end. This optical amplification module 1 has an optical isolator 21, a WDM coupler 31, an Er-doped optical fiber (EDF) 51, a WDM coupler 32, and an optical isolator 22, which are arranged in order on a signal light propagation path from the input connector 11 to the output connector 12. The optical amplification module 1 also has a pumping light source 41 connected to the WDM coupler 31, and a pumping light source 42 connected to the WDM coupler 32. The two ends of EDF 51 are fusion-spliced to single-mode fibers 81, 82 as connection terminals. In the drawing arrows A and B indicate fusion-spliced portions between EDF 51 and single-mode fibers 81, 82.

The optical isolator 21 lets light pass in the forward direction from the input connector 11 toward the WDM coupler 31, but does not allow light to pass in the backward direction. The WDM coupler 31 outputs the signal light coming from the optical isolator 21, toward EDF 51 and also outputs pumping light from the pumping light source 41, toward EDF 51. The WDM coupler 32 outputs the signal light coming from EDF 51, toward the optical isolator 22 and also outputs pumping light from the pumping light source 42, toward EDF 51. The optical isolator 22 lets light pass in the forward direction from the WDM coupler 32 toward the output connector 12, but does not allow light to pass in the backward direction. Each of the pumping light sources 41, 42 outputs the pumping light of a wavelength (0.98 μm or 1.48 μm) that can excite Er ions with which the EDF 51 is doped.

The EDF 51 is an optical fiber which consists primarily of silica glass and in which the core region is doped with Er, and amplifies the signal light coming from the WDM coupler 31, under supply of the pumping light from the WDM couplers 31, 32. The amplified signal light is outputted toward the WDM coupler 32. Specifically, the EDF 51 is preferably a multimode optical fiber in which the number of propagatable transverse modes is 2 or more but 40 or less, in the entire optical amplification band.

In the optical amplification module 1, the pumping light emitted from the pumping light source 41 is supplied forward through the WDM coupler 31 into the EDF 51 and the pumping light emitted from the pumping light source 42 is supplied backward through the WDM coupler 31 into the EDF 51. The signal light inputted through the input connector 11 passes through the optical isolator 21 and the WDM coupler 31 in order, and then reaches the EDF 51. The signal light is amplified in this EDF 51. The signal light amplified in the EDF 51 passes through the WDM coupler 32 and the optical isolator 22 in order and is outputted through the output connector 12 to the outside.

Particularly, the EDF 51 of the first embodiment has the mode field diameter (MFD) of 10 μm or more with respect to the fundamental-mode light and the MAC number (=MFD/cutoff wavelength) of 6.8 or less with respect to the fundamental-mode light, as characteristics at the longest wavelength in the optical amplification band, i.e., at the wavelength of 1607 nm. This configuration permits the EDF 51 to effectively reduce the nonlinear interaction between signal channels and also to effectively reduce the bending loss, even in the case of transmission of multiplexed signal light in which multiple signal channels are arranged in high density with the optical frequency interval of 25 GHz or less. The outer diameter of the core region in EDF 51 is preferably larger than the mode field diameter but smaller than twice the mode field diameter.

Next, specific examples of EDF 51 will be described along with a comparative example. FIG. 2 is a table showing a list of specifications of EDFs (types A and B) prepared as examples of the EDF 51 and an EDF (type C) as a comparative example. Each of the EDFs of types A to C shown in the table of FIG. 2 has a refractive index profile of an approximate step-index type. Although the EDF of type C is a comparative example, it is one in which the Er concentration and the cutoff wavelength for the fundamental-mode light are optimized and in which the FWM occurrence efficiency is reduced in comparison with the conventional EDFs, however.

As for the EDFs of types A and B, the cutoff wavelength for the fundamental-mode light is longer than the signal light wavelength region and the number of theoretically propagatable modes ranges from 20 to 30 or more. However, they were free of splice loss, which is an evidence of excitation of higher-order modes, unless significant axial misalignment or the like occurred at spliced portions, and the splice loss with an ordinary single-mode fiber was always 0.3 dB or less. After the EDFs of types A and B including the spliced portions were subjected to a heat cycle (HC), no anomaly appeared in the gain and Noise Figure (NF). The reason for it is as follows. The gain degrades with increase of temperature because of the temperature dependence of fluorescence and absorption characteristics of Er itself, but the noise figure characteristics change approximately within the range of ±0.1 dB equivalent to measurement error and thus demonstrate no significant degradation. Since the gain after the end of HC (when the temperature in returned again to 25° C.) recovers to the value before the heat cycle, there is no degradation of fusion splice loss (cf. T. Mizuochi, et al., OFC96, Tech. Dig., WF2, 1996).

Figure 3:
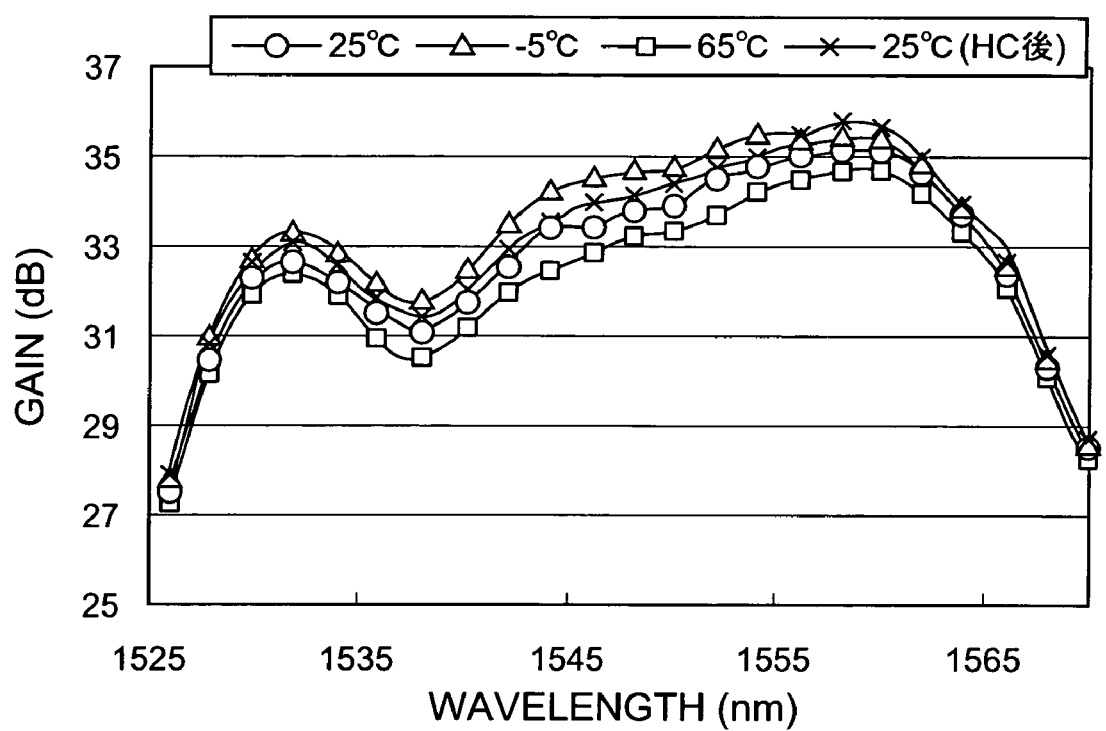
FIG. 3 is a graph showing gain characteristics in the C-band at temperatures of −5° C., 25° C., 65° C., and after HC (25° C.) of the EDF of type B (4.8 m long)
Figure 4:
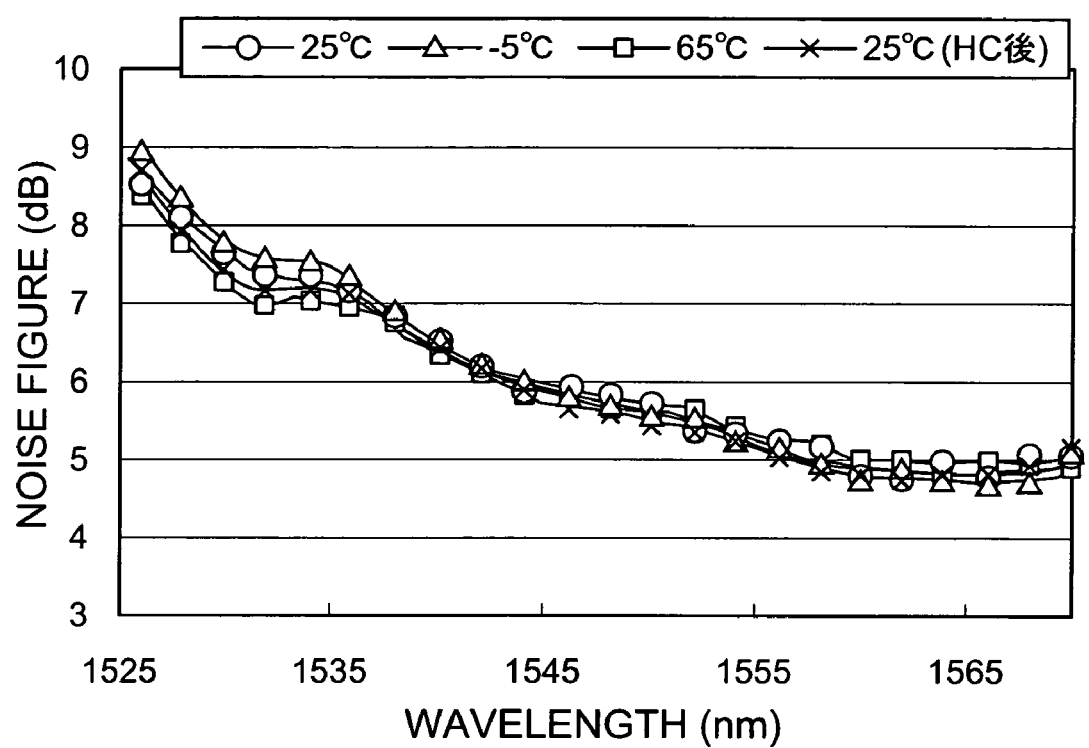
FIG. 4 is a graph showing noise figure characteristics in the C-band at temperatures of −5° C., 25° C., 65° C., and after HC (25° C.) of the EDF of type B (4.8 m long)

FIG. 3 is a graph showing the gain characteristics at the temperatures of −5° C., 25° C., 65° C., and after HC (25° C.) of the EDF of type B (4.8 m long). FIG. 4 is a graph showing the noise figure characteristics at the temperatures of −5° C., 25° C., 65° C., and after HC (25° C.) of the EDF of type B (4.8 m long). These graphs show the measurement results obtained under such setting that ordinary single-mode fibers were directly fusion-spliced to the light input end side and to the light output end side of the EDF of type B and that the EDF was bidirectionally pumped by the pumping light of the 1.48 μm wavelength band and 200 mW, and the EDF temperatures were set in the order of 25° C., −5° C., 65° C., and 25° C. (heat cycle). With an EDF in which the core diameter was further expanded and in which the number of propagatable modes was 200 or more, a notable splice loss was observed. The above verified that there was no trouble in amplification of signal light of the fundamental mode even in the multimode EDF as long as the number of propagatable modes in the EDF was 40 or less. Namely, the change amount of the gain even after HC of −5° C. to 65° C. is within 0.4 dB. Since there are two spliced portions of the measured object at the light entrance end and at the light exit end, the change amount of gain per spliced portion is 0.2 dB or less. In FIGS. 3 and 4 the gain seems to change depending upon the temperature, which is because the gain as a characteristic of EDF itself is dependent upon temperature change.

Figure 5:
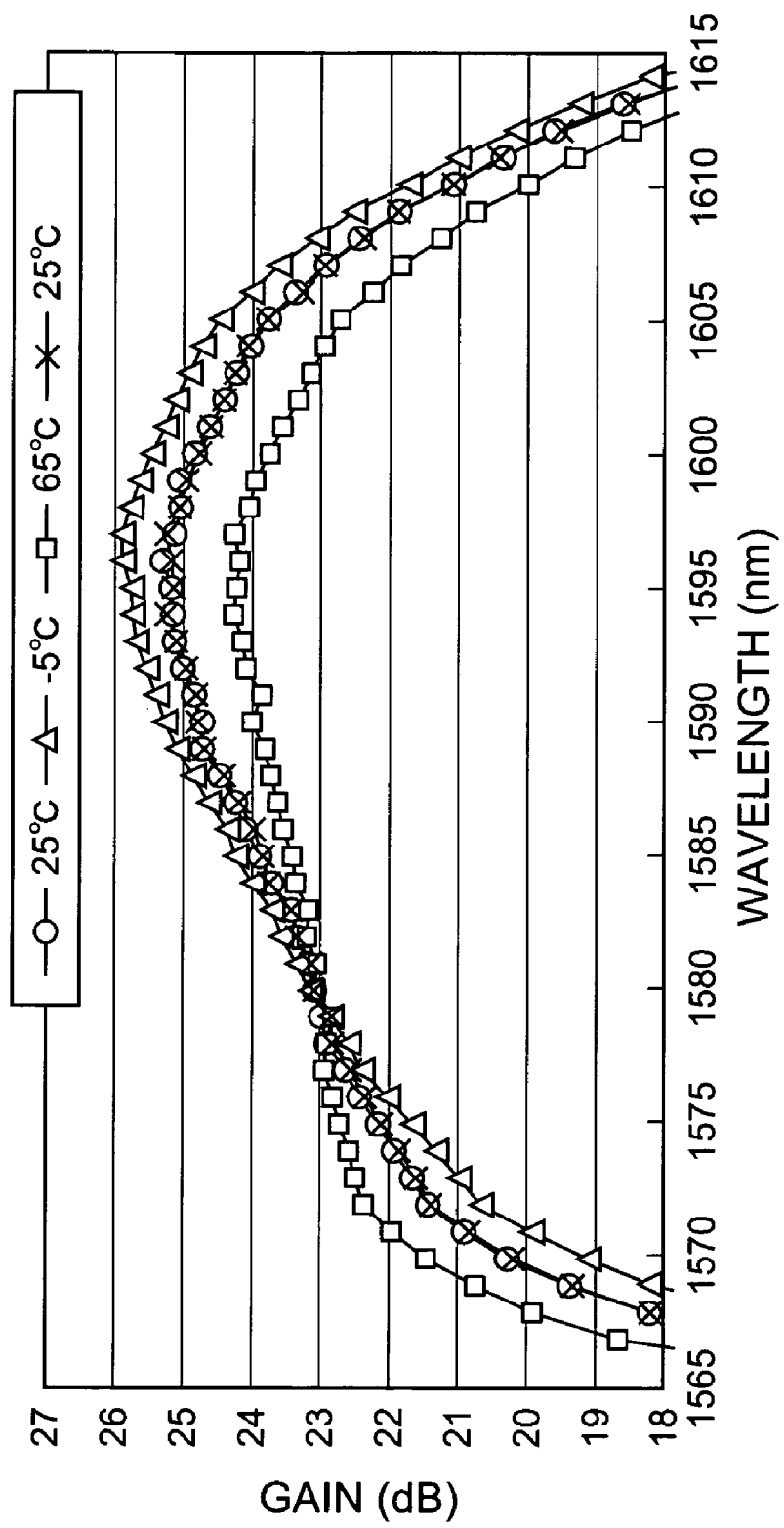
FIG. 5 is a graph showing gain characteristics in the L-band at temperatures of −5° C., 25° C., 65° C., and after HC (25° C.) of the EDF of type B (25.2 m long)
Figure 6:
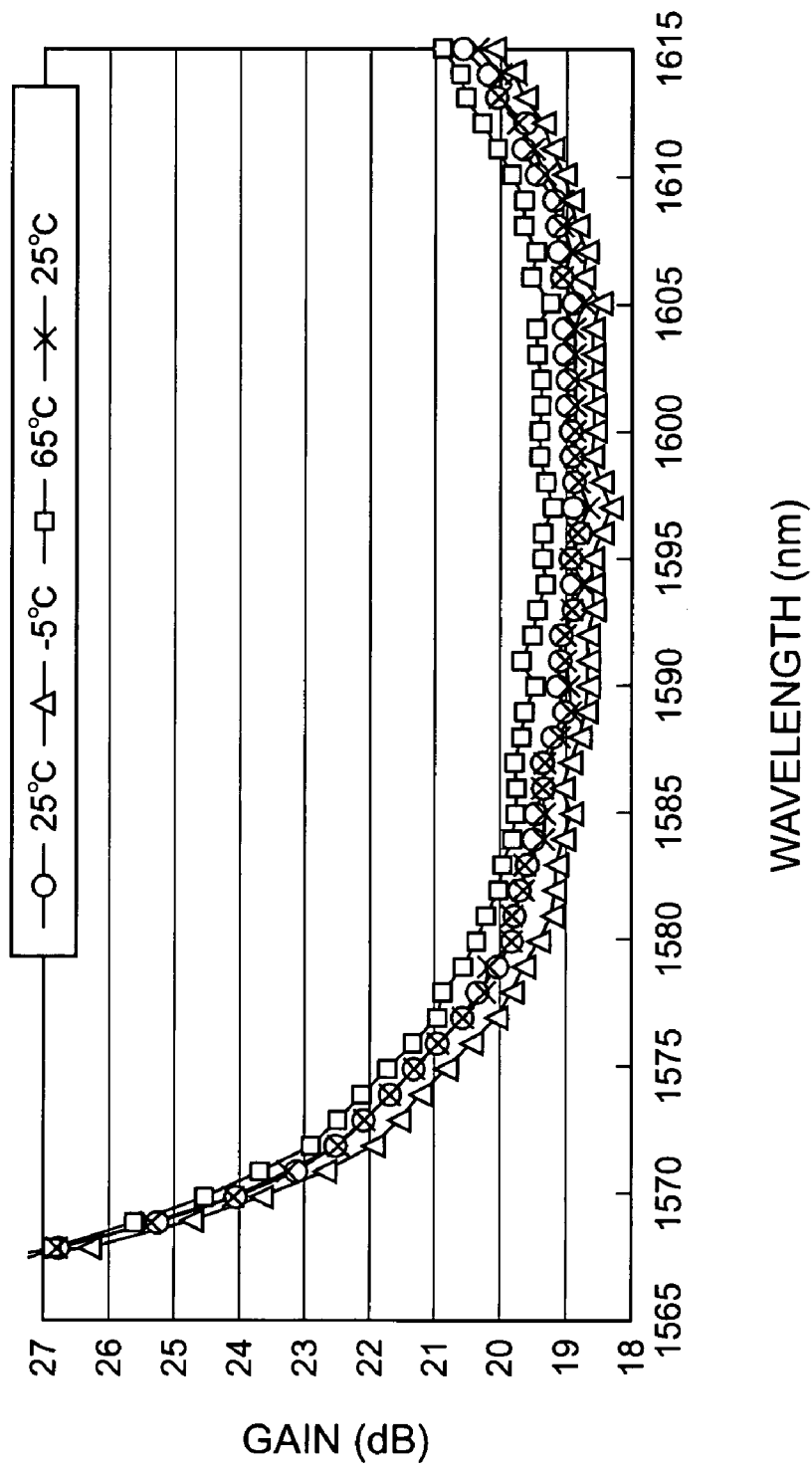
FIG. 6 is a graph showing noise figure characteristics in the L-band at temperatures of −5° C., 25° C., 65° C., and after HC (25° C.) of the EDF of type B (25.2 m long)

Furthermore, FIG. 5 is a graph showing the gain characteristics in the L-band at the temperatures of −5° C., 25° C., 65° C., and after HC (25° C.) of the EDF of type B (25.2 m long). FIG. 6 is a graph showing the noise figure characteristics in the L-band at the temperatures of −5° C., 25° C., 65° C., and after HC (25° C.) of the EDF of type B (25.2 m long). These graphs also show the measurement results obtained under such setting that ordinary single-mode fibers were directly fusion-spliced to the light input end side and to the light output end side of the EDF of type B and that the EDF was bidirectionally pumped by the pumping light of 1.48 μm wavelength band and 200 mW, and the EDF temperatures were set in the order of 25° C., −5° C., 65° C., and 25° C. The gain and noise figure characteristics had no ripple even through the process of HC (though the gain slope changed because of the temperature dependence of the amplification characteristic itself of EDF), and the gain and noise figure characteristics after HC demonstrated only the change of 0.15 $dB_{p\text{-}p}$ or mless. It is thus seen that in the L-band the fusion splice between the EDF of type B and single-mode fibers is also independent of temperature and high reliability is secured.

Figure 7:
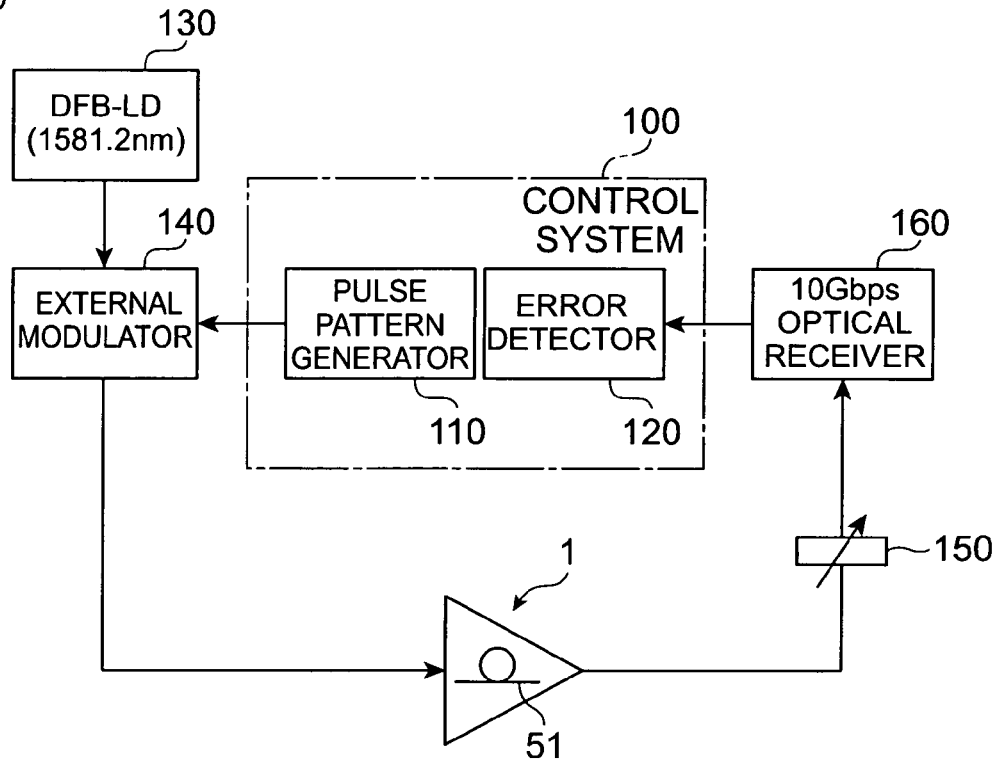
FIG. 7 is an illustration showing a configuration of a measuring system for measuring BER, and a table showing fusion splicing conditions for optical fiber.
Figure 8:
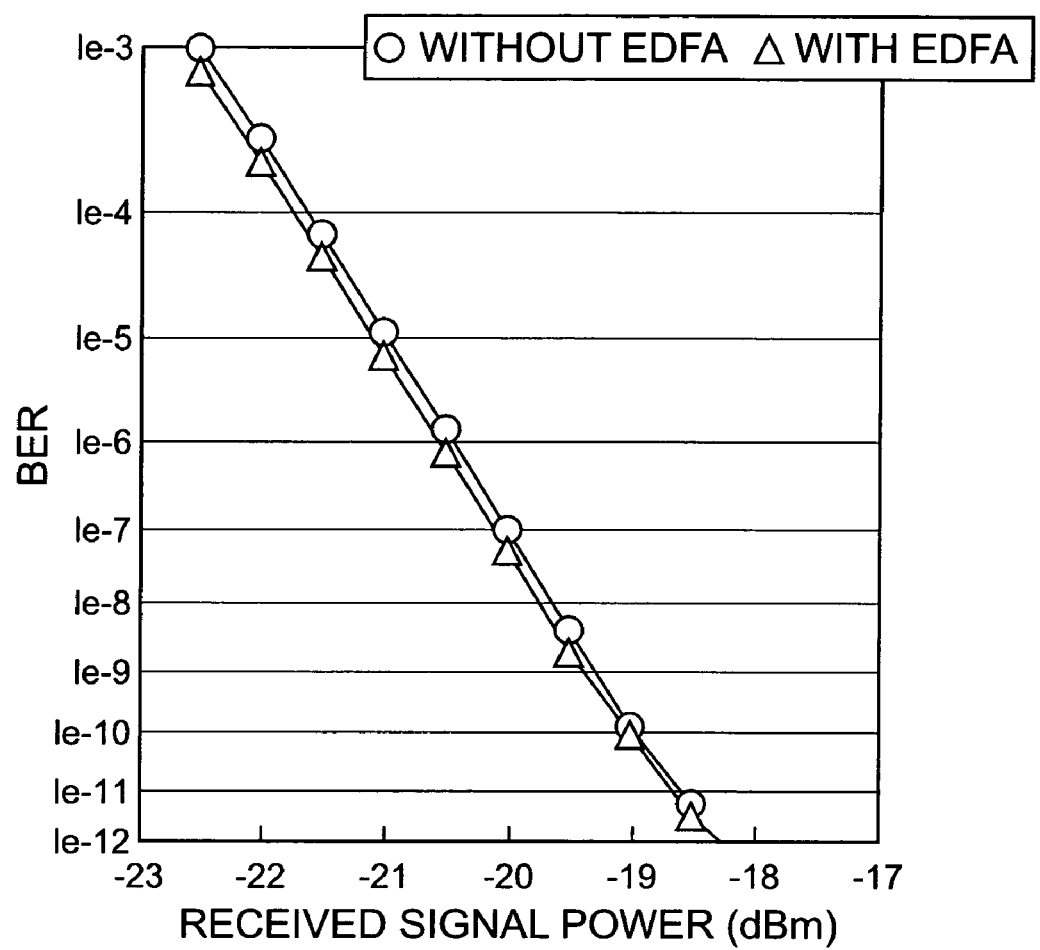
FIG. 8 is a graph showing a relation of BER against received optical power, as the results of measurement by the measuring system shown in FIG. 7.

As a collateral evidence of the aforementioned "fact that no higher-order mode is generated," the bit error rate (BER) was measured in a case where the 10 Gbit/s-NRZ signal was amplified by an EDFA using the EDF of type B shown in FIG. 2, in a length equivalent to the unsaturated absorption=about 570 dB (about 18.2 m) (which is the optical amplification module 1 shown in FIG. 1), and in a case without amplification (i.e., a back-to-back case). The area in FIG. 7 is an illustration showing a configuration of a measuring system. In this measuring system, a signal light source is comprised of a distributed feedback laser diode (DFB-LD) 130 for emitting light of the wavelength of 1581.2 nm, and an external modulator 140 for modulating the laser light from the DFB-LD 130 in accordance with a pulse pattern generated from a pulse pattern generator 110. Light outputted from an EDFA (optical module 1) being an object to be measured travels through a variable attenuator 150 to be received by a 10 Gbps optical receiver 160, and BER is measured by an error detector 120 in a control system 100. FIG. 8 shows the BER measurement results. PRBS was of 31 stages and the input and output powers of EDFA 1 were −3 and ±15 dBm, respectively (i.e., operation gain=18 dB).

As apparent from FIG. 8, there occurs little degradation of BER due to passage through the EDFA, as compared with the case without amplification (back-to-back case). The jitter was also evaluated during the measurement of BER, and it was found that the peak-to-peak jitter was 18.7 ps before insertion of the EDFA and 17.3 ps after insertion of the EDFA and thus that there was little significant difference and no degradation was observed.

Suppose an optical component resulting from coupling from the fundamental mode to a higher-order mode was generated at the fusion-spliced portion A or B or during the process of propagation in the EDF. Then let the crosstalk thereof be X. Since the transmission quality is affected by an optical component resulting from re-coupling into the fundamental mode at the light exit end of the EDF, the power penalty P (dB) is given by Formula (3) below.

$$P = 10 \cdot \log(1 - 4\sqrt{X}) \quad (3)$$

As seen from Formula (3) above, P is clearly below the limit of measurement error (normally, about 0.1 dB), and X calculated therefrom is found to be −45 dB or less.

Where excitation of higher-order mode light occurs at the fusion-spliced portions only, the crosstalk component is the optical component resulting from coupling from the fundamental mode to a higher-order mode at the light entrance end of the EDF and re-coupling of part of the higher-order mode into the fundamental mode at the light exit end. Therefore, it is seen that the crosstalk per spliced portion is at most −22.5 dB (=0.6%).

On the other hand, where the crosstalk occurs only inside the EDF, the crosstalk increases with increase of length of the EDF, as described in aforementioned Document 4. It is, however, seen that the crosstalk occurring over the length of 18.2 m is −45 dB or less. As also seen from FIG. 10 described later, a too short EDF is disadvantageous in view of pumping efficiency. Even in the case where the signal input is +10 dBm, a desired length of the EDF is one equivalent to the unsaturated absorption of 10 dB or more in terms of L-band flattened gain. As described hereinafter, the unsaturated absorption=570 dB is equivalent to the L-band flattened gain=18 dB. It is thus understood that the unsaturated absorption equivalent to the L-band flattened gain≧10 dB is 320 dB.

The crosstalk can degrade if the length of the EDF satisfying the unsaturated absorption=320 dB is too long. From the aforementioned measurement results the adverse effect on communication quality can be ignored at least in the length of 18.2 m. Therefore, the unsaturated absorption peak per unit length ($\alpha_{1.53}$) as an EDF is preferably not less than 320/18.2=17.2 dB/m.

It is seen that an enormous power penalty is imposed if coupling occurs at the rate of $1/e^2$ as described in aforementioned Document 3. Namely, this standard of Document 3 is too easy in application requiring some signal quality, and is thus useless.

It is particularly noted that the EDF 51 requires no Optical Imaging System, which necessitates the complex lens system as in above Document 3 and Document 4, and it can achieve good crosstalk by direct fusion splice with ordinary single-mode fibers 81, 82. In the case of EDF 51, since the MFD thereof is close to those of the ordinary single-mode fibers as is the case with the EDFs of types A and B in FIG. 2, it becomes feasible to implement such easy and practical splice. Better fusion splice loss can be achieved rather by decrease of heating time from the condition of fusion splice between normal single-mode fibers. Optimal fusion splicing conditions for the EDF of type B are presented in the area (b) of FIG. 7. However, a fusion splicer used was Type 35SE available from Sumitomo Electric Industries, Ltd. In this example, the fusion splice was carried out by arc discharge. Since the discharge time is short, it is possible to suppress the depreciation of discharge electrode rods. Besides the splicers using the discharge, there are also splicers using heating by filament. Since the heating time is also short in this example, there is the advantage that the lifetime of the filament part can be extended. The fusion splicing conditions shown in the area (b) of FIG. 7 also apply to the case of fusion splice between type A and single-mode fibers.

The next concern about the EDFs with the expanded MFD like types A and B is degradation of Power Conversion Efficiency (PCE). Namely, each of the pumping light and the signal light suffers decrease in optical power per unit area, i.e., light intensity because of the expansion of the mode field. However, PCE is affected by various operation conditions such as the population inversion inside EDF, the input/output level of signal light, and the pumping method (forward, backward, or bidirectional). Among the most general conditions, it is first important to maintain gain flatness in the amplification of WDM signal. Namely, it is preferable to keep the population inversion always constant. In addition, 1.48 μm-band pumping is excellent in PCE, and the most popular method is the bidirectional pumping method superior in both PCE and noise figure characteristics.

Figure 9:
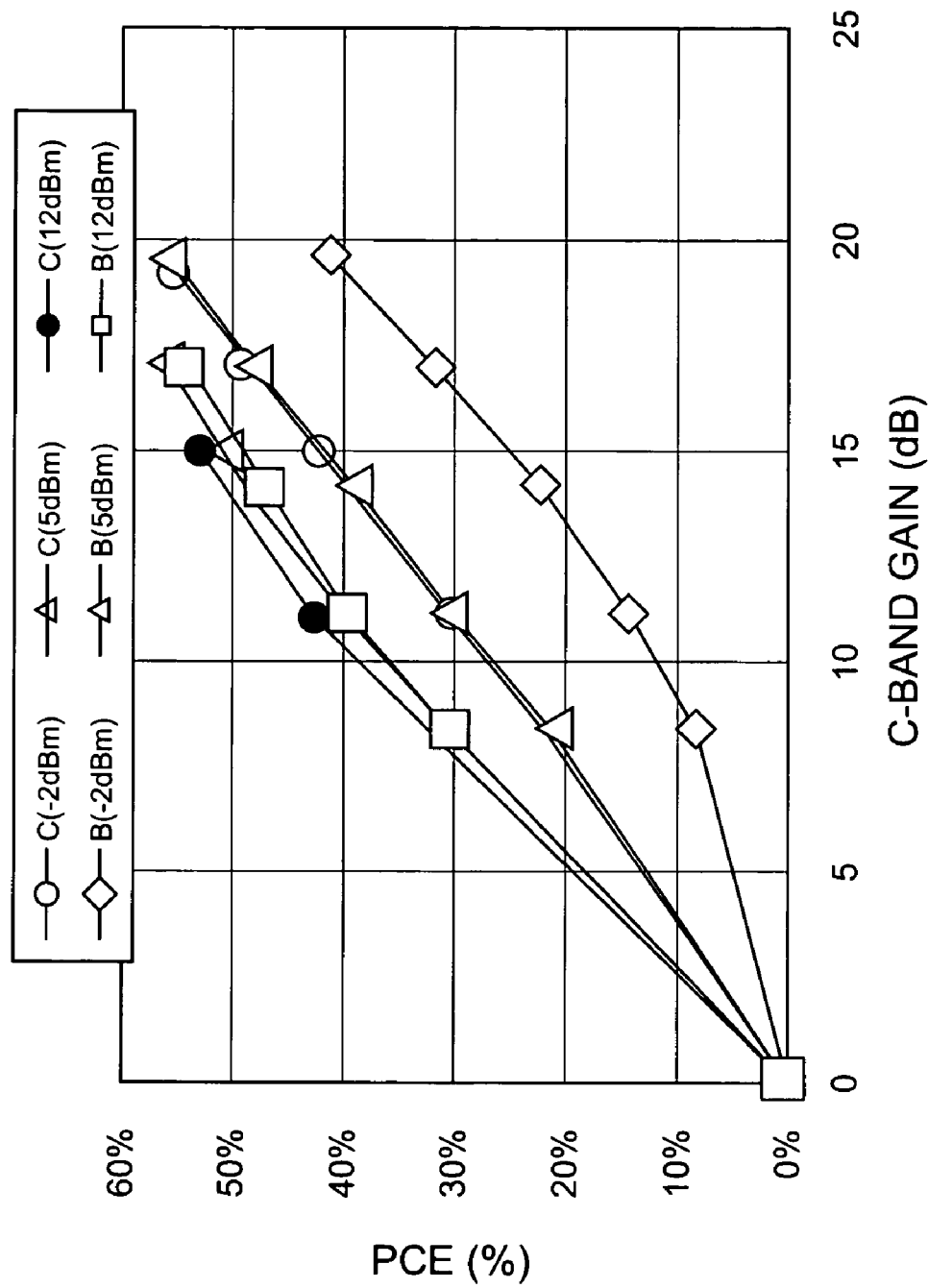
FIG. 9 is a graph showing a relation of gain and PCE in the C-band as to each of EDFs of types B and C.
Figure 10:
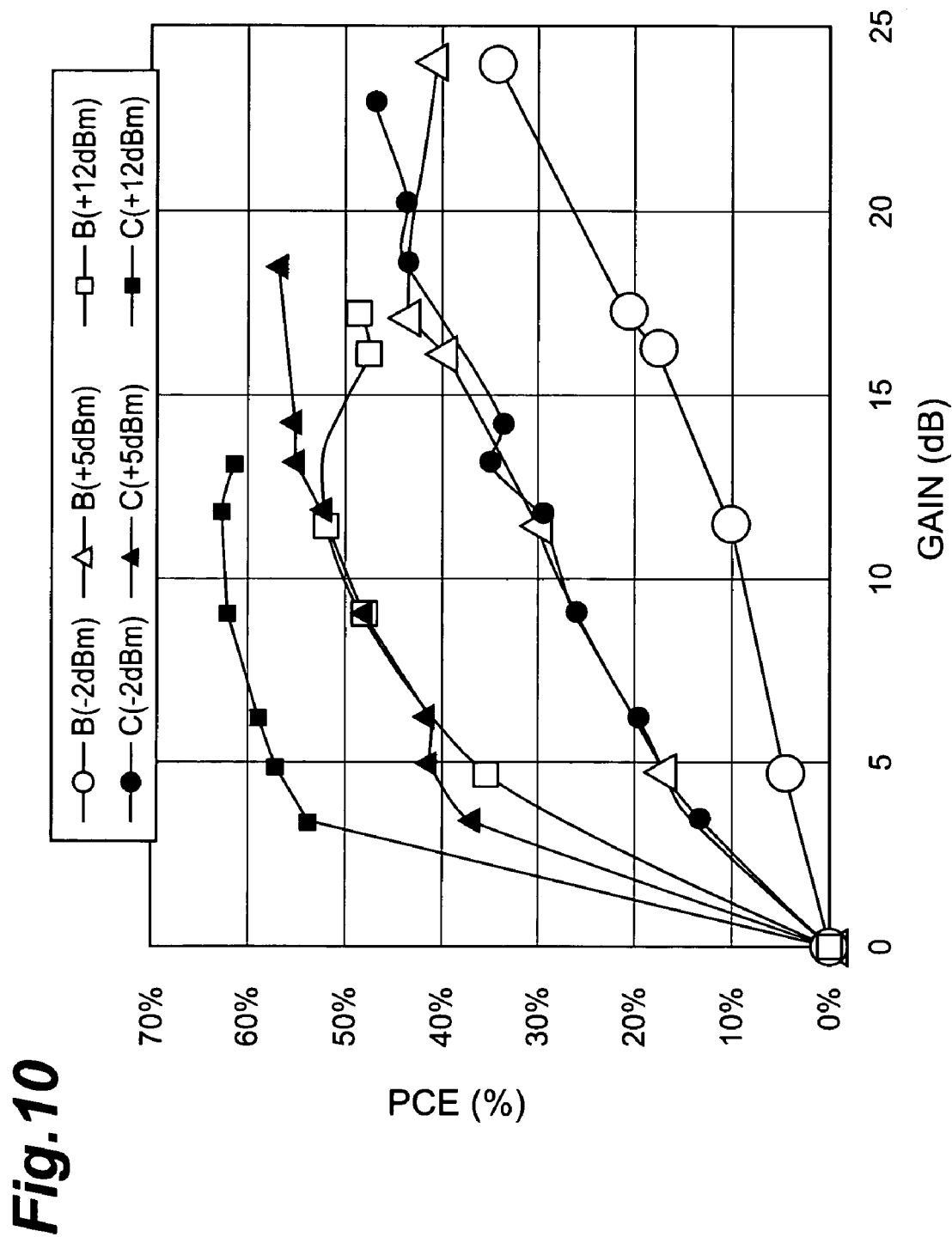
FIG. 10 is a graph showing a relation of gain and PCE in the L-band as to each of EDFs of types B and C.

In view of the above, PCE was measured at varying lengths of EDF (proportional to the magnitude of gain (dB)) and varying signal input powers in a state in which the pumping power allocation between forward and backward was kept at 1:1 and in which the population inversion was also maintained so as to keep the gain deviation always minimum. It is known about the ordinary single-mode EDFs that the dependence of PCE on length is almost invariant in the C-band, but is largely dependent on the signal input power in the L-band. However, it was observed in the actual measurement of PCE with the EDF of type B that PCE has significant dependence on the signal input power both in the C-band and in the L-band, as shown in FIGS. 9 and 10. A conceivable reason for it is that the decrease in light intensity increases the threshold pumping power for transition from absorption to amplification. FIG. 9 is a graph showing the relation between gain and PCE in the C-band as to the EDFs of types B and C. FIG. 10 is a graph showing the relation between gain and PCE in the L-band as to the EDFs of types B and C.

Namely, PCE is more improved with increase in the signal input power, but can never be improved up to infinity. The improvement in PCE becomes saturated above a certain level of signal input power. With reference to FIG. 9, where the signal input power is +12 dBm, even the EDF of type B demonstrates PCE comparable to that of the conventional EDF of type C. Namely, it is considered that the degradation of PCE can be minimized even with use of the EDF according to the embodiment of the present invention with the expanded MFD as long as it is selectively used in such operation conditions that the signal input power is high. Concerning PCE in the L-band in FIG. 10, the EDF of type B at the signal input power of +5 dBm has PCE about 20% lower than that of the EDF of type C at the signal input power of +5 dBm, but it is an indisputable fact that the degradation amounts are alleviated with increase in the signal input power.

As shown in FIG. 1, the multimode EDF 51 of the first embodiment may be used alone under the operation condition that the signal input power is originally high (preferably, +10 dBm or more). Alternatively, as shown in FIGS. 11 and 12, the EDF 51 may be used in such a configuration that on the light entrance end side thereof another EDF 61 raises the signal input power to a certain level (preferably, +10 dBm or more) and thereafter the signal light is inputted into the EDF 51 (an optical amplification method according to the present invention).

Figure 11:
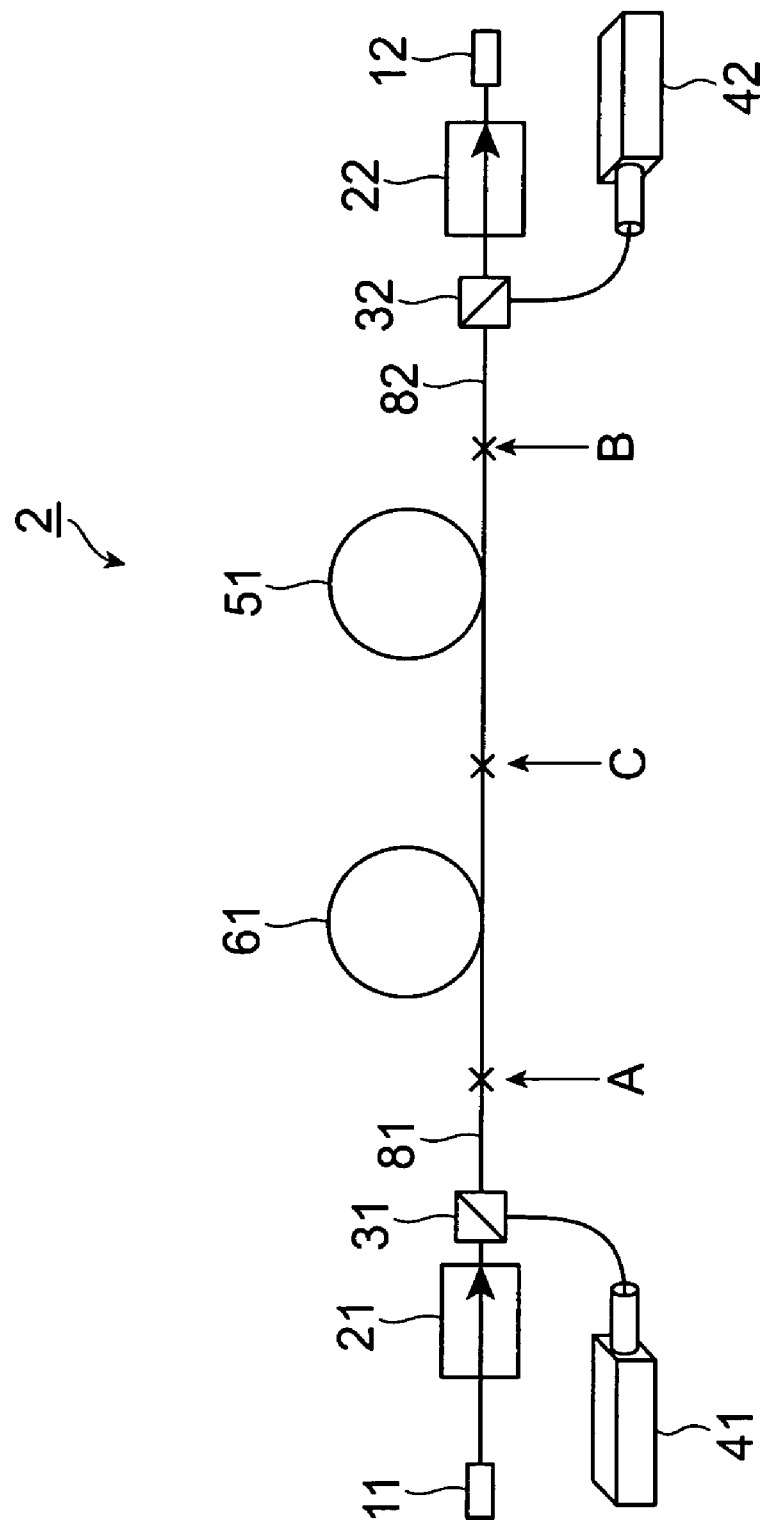
FIG. 11 is an illustration showing a configuration of a second embodiment of an optical amplification module according to the present invention.

FIG. 11 is an illustration showing a configuration of the second embodiment of the optical amplification module according to the present invention. The optical amplification module 2 of the second embodiment is different from the first embodiment in that it has another EDF 61 placed between WDM coupler 31 and EDF 51. The EDF 61 is an optical fiber which consist primarily of silica glass and in which the core region is doped with Er. The EDF 61 amplifies the signal light coming from the WDM coupler 31, under supply of the pumping light from WDM couplers 31, 32 and outputs the amplified signal light to EDF 51. The EDF 61 has the cutoff wavelength shorter than the shortest wavelength (the wavelength of 1607 nm) in the optical amplification band, with respect to the fundamental-mode light, and is the single mode in the optical amplification band. If FIG. 11, arrow A indicates a fusion spliced portion between single-mode fiber 81 as a connection terminal and EDF 61, arrow C a fusion spliced portion between EDF 61 and EDF 51, and arrow B a fusion spliced portion between EDF 51 and single-mode fiber 82 as a connection terminal.

In the optical amplification module 2 of the second embodiment, the pumping light emitted from the pumping light source 41 is supplied forward through the WDM coupler 31 into the EDF 61 and EDF 51, while the pumping light emitted from the pumping light source 42 is supplied backward through the WDM coupler 32 into the EDF 51 and EDF 61. After the signal light is inputted through the input connector 11, the signal light passes through the optical isolator 21 and WDM coupler 31 in order, and is amplified in the EDF 61 and EDF 51. The amplified signal light passes through the WDM coupler 32 and optical isolator 22 and is outputted from the output connector 12 to the outside.

Figure 12:
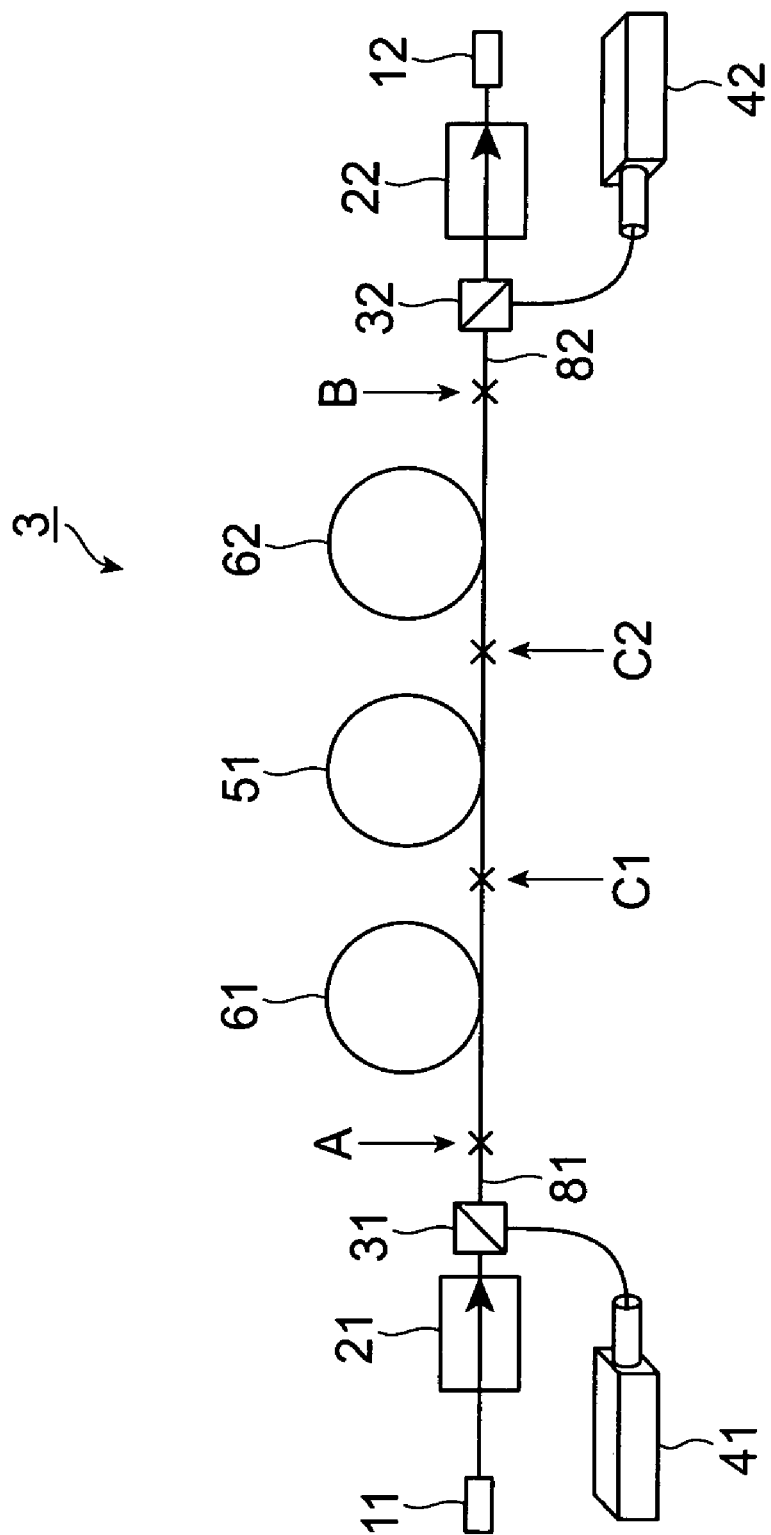
FIG. 12 is an illustration showing a configuration of a third embodiment of an optical amplification module according to the present invention.

FIG. 12 is an illustration showing a configuration of the third embodiment of the optical amplification module according to the present invention. The optical amplification module 3 of the third embodiment is different from the aforementioned second embodiment in that EDFs 61 and 62 are placed on the light entrance end side and on the light exit end side of EDF 51, respectively. Particularly, EDF 62 is an optical fiber which consists primarily of silica glass and in which the core region is doped with Er. The EDF 62 amplifies the signal light coming from the EDF 51, under supply of the pumping light from the WDM couplers 31, 32. The optically amplified signal light is then outputted from this EDF 62 to the WDM coupler 32. Furthermore, the EDF 62, similar to EDF 61, has the cutoff wavelength shorter than the shortest wavelength (the wavelength of 1607 nm) in the optical amplification band, with respect to the fundamental-mode light, and is the single mode in the optical amplification band.

In the optical amplification module 3 of the third embodiment, the pumping light emitted from the pumping light source 41 is supplied forward through the WDM coupler 31 into the EDF 61, EDF 51, and EDF 62, while the pumping light emitted from the pumping light source 42 is supplied backward through the WDM coupler 32 into the EDF 62, EDF 51, and EDF 61. After the signal light is inputted through the input end 11, the signal light passes through the optical isolator 21 and WDM coupler 31 in order and is amplified in the EDF 61, EDF 51, and EDF 62. This optically amplified signal light passes through the WDM coupler 32 and optical isolator 22 in order and is outputted from the output connector 12 to the outside.

When a trade-off between PCE and suppression of non-linearity is pursued in the composite configurations of the multimode EDF and single-mode EDF(s) as in the second and third embodiments described above, PCE is more affected by the properties of the EDF located closer to the output connector 12, and it is thus undesirable to use the nonlinearity-suppressing EDF with low PCE on the output end side. The tripartite configuration as shown in FIG. 12 is preferable in terms of aiming for improvement in PCE.

Figure 13:
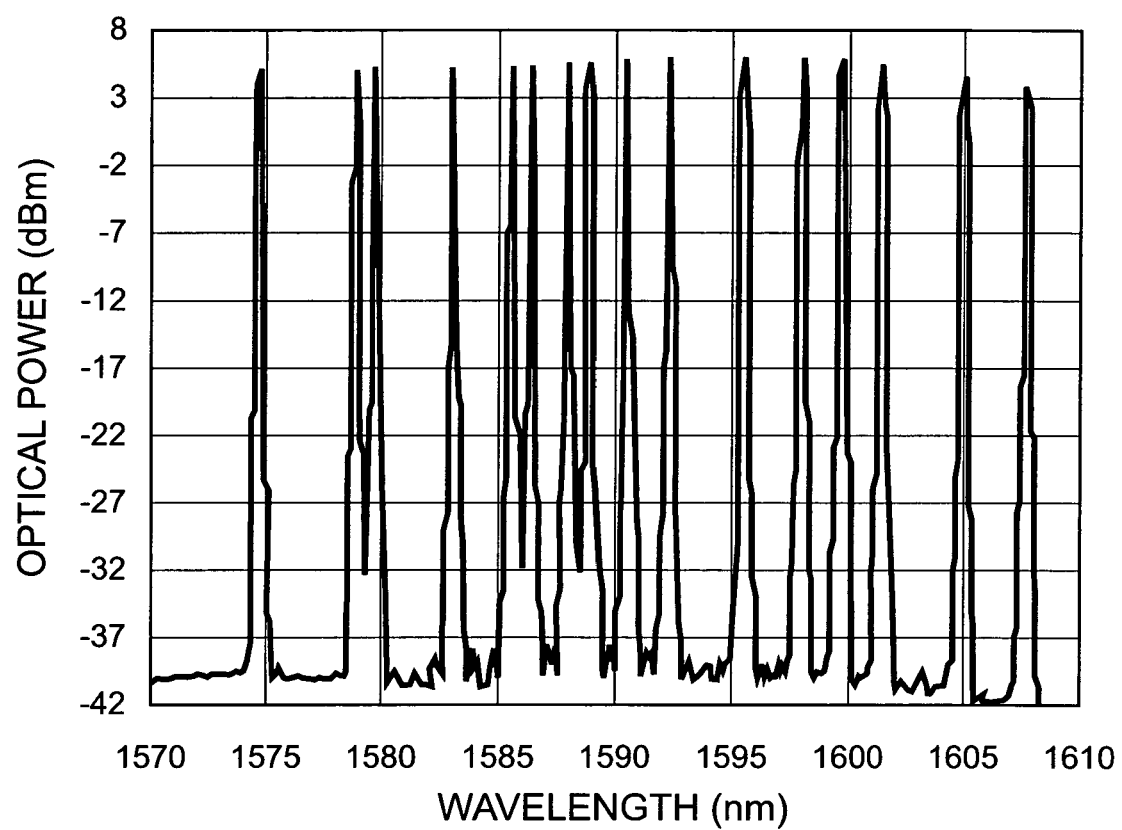
FIG. 13 is a signal light output spectrum of an optical amplification module to which an EDF of type A is applied.
Figure 14:
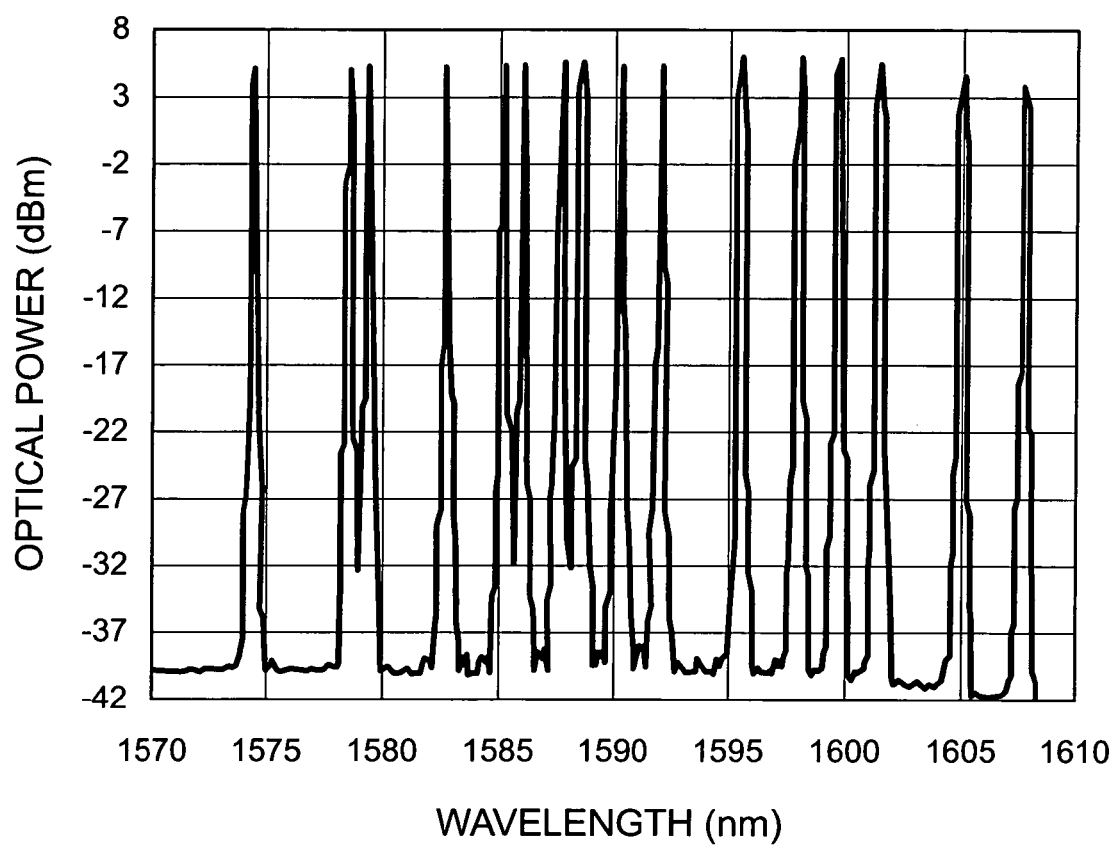
FIG. 14 is a signal light output spectrum of an optical amplification module to which an EDF of type B is applied.
Figure 15:
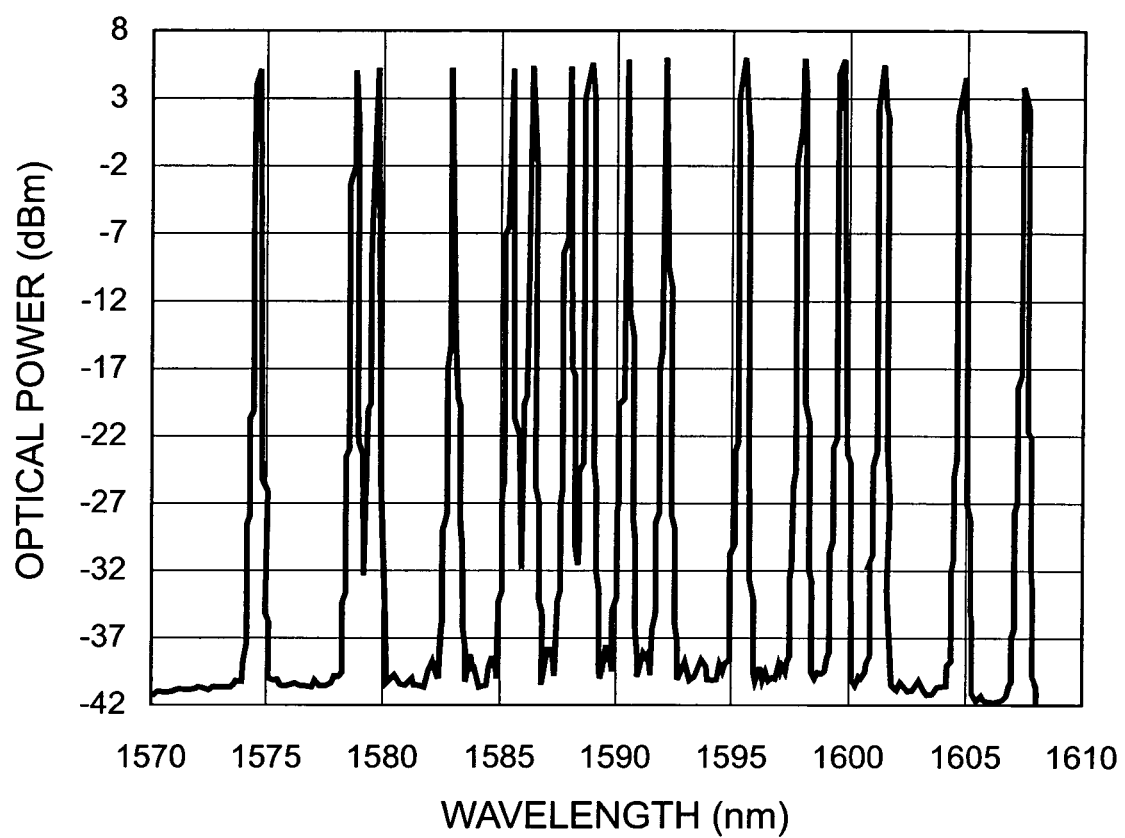
FIG. 15 is a signal light output spectrum of an optical amplification module to which EDFs of types C and B are applied.
Figure 16:
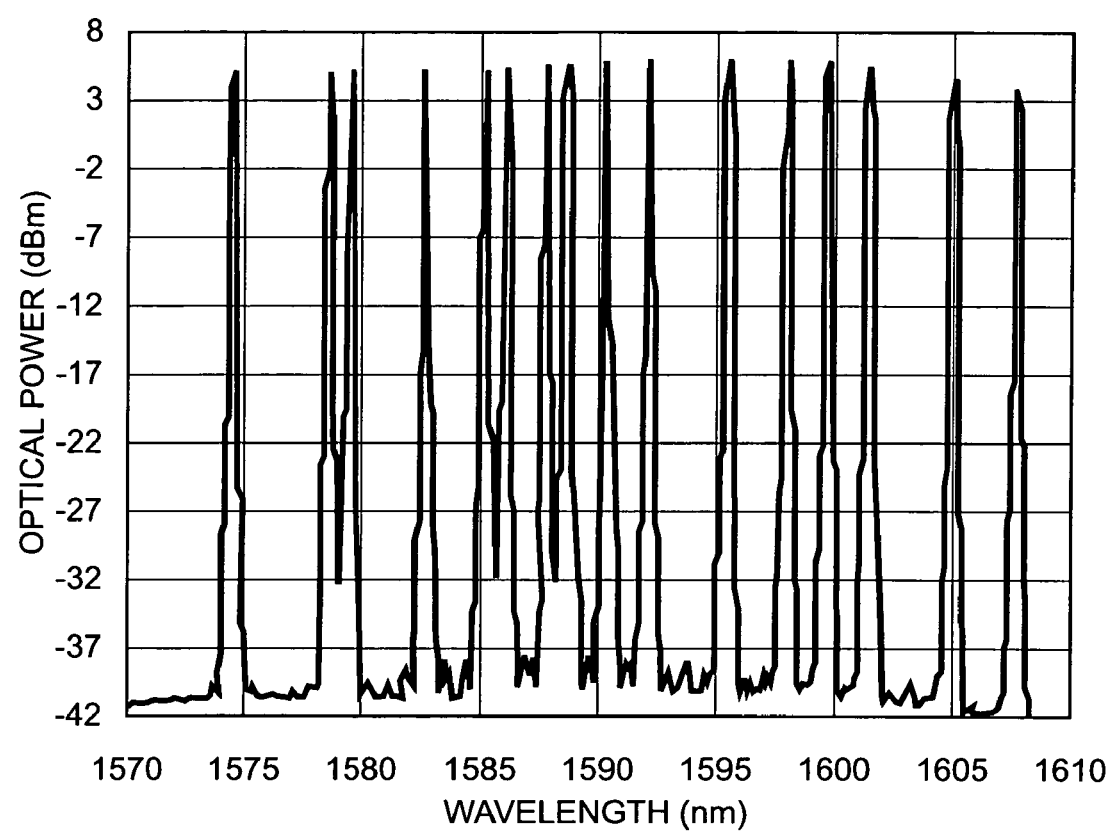
FIG. 16 is a signal light output spectrum of an optical amplification module to which the EDFs of types C and B are applied.
Figure 17:
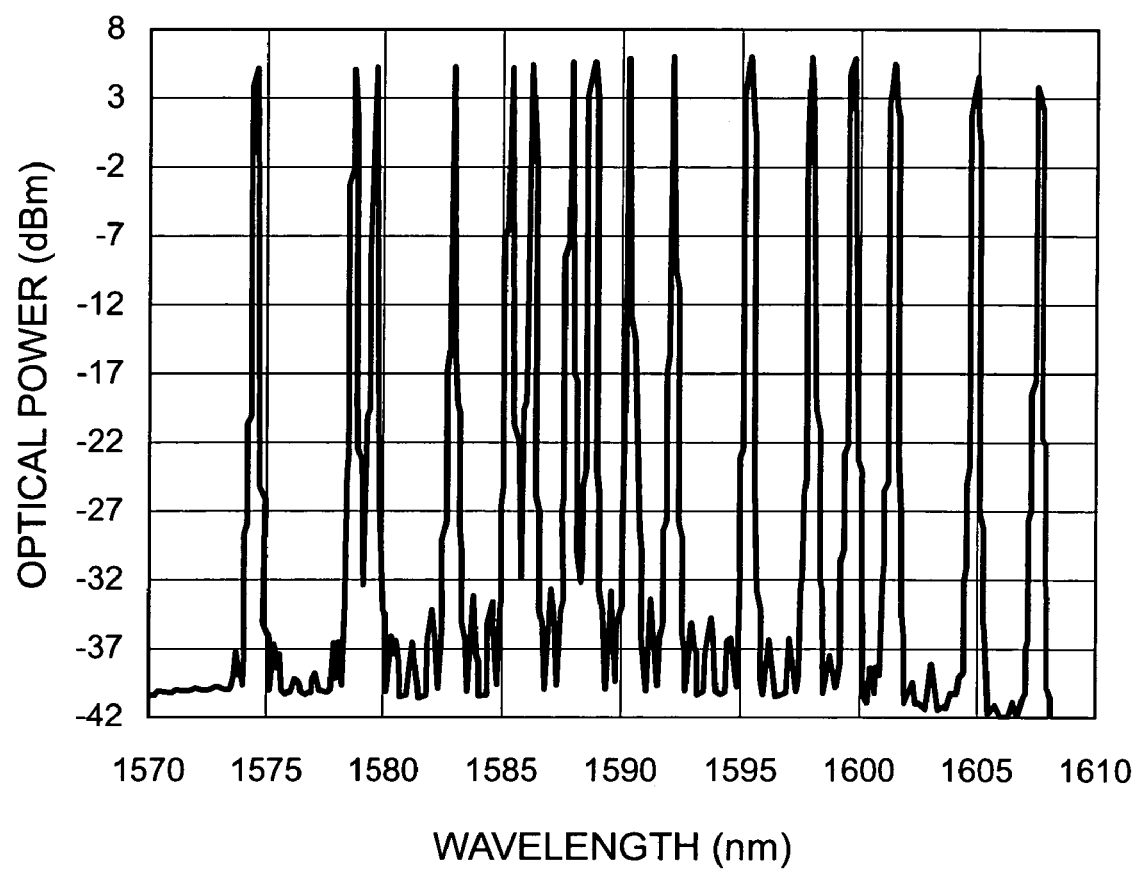
FIG. 17 is a signal light output spectrum of an optical amplification module to which an EDF of type C is applied.

FIG. 13 is a signal light output spectrum of optical amplification module 1 of the first embodiment to which the EDF of type A is applied as EDF 51. FIG. 14 is a signal light output spectrum of optical amplification module 1 of the first embodiment to which the EDF of type B is applied as EDF 51. FIG. 15 is a signal light output spectrum of optical amplification module 2 of the second embodiment (bipartite configuration) to which the EDF of type B is applied as EDF 51 and the EDF of type C as EDF 61. Furthermore, FIG. 16 is a signal light output spectrum of optical amplification module 3 of the third embodiment (tripartite configuration) to which the EDF of type B is applied as EDF 51 and the EDF of type C as EDFs 61 and 62. FIG. 17 is a signal light output spectrum of an optical amplification module to which the EDF of type C is applied, as a comparative example (in the same configuration as the optical amplification module 1 of the first embodiment).

In each of FIGS. 13 to 17, the unsaturated absorption is set at 570 dB, and the bidirectional pumping is effected in a state in which the ratio of pumping powers in the forward direction and in the backward direction is set at 1:1. The wavelength of pumping light is the 1.48 μm band, the total signal input power into the input connector 11 +10 dBm, and the total signal output power from the output connector 12 +28 dBm. The length of the EDF 61 of type C in the bipartite configuration (FIG. 11 and FIG. 15) is 10 m, and the length of each of the EDFs 61, 62 of type C in the tripartite configuration (FIG. 12 and FIG. 16) is 5 m. The signal channels are sixteen channels, and the wavelengths of the respective signal channels are 1574.6 nm, 1578.7 nm, 1579.6 nm, 1582.8 nm, 1585.3 nm, 1586.2 nm, 1587.88 nm, 1588.76 nm, 1590.4 nm, 1592.16 nm, 1595.48 nm, 1598.08 nm, 1599.72 nm, 1601.4 nm, 1604.9 nm, and 1607.56 nm.

Figure 18:
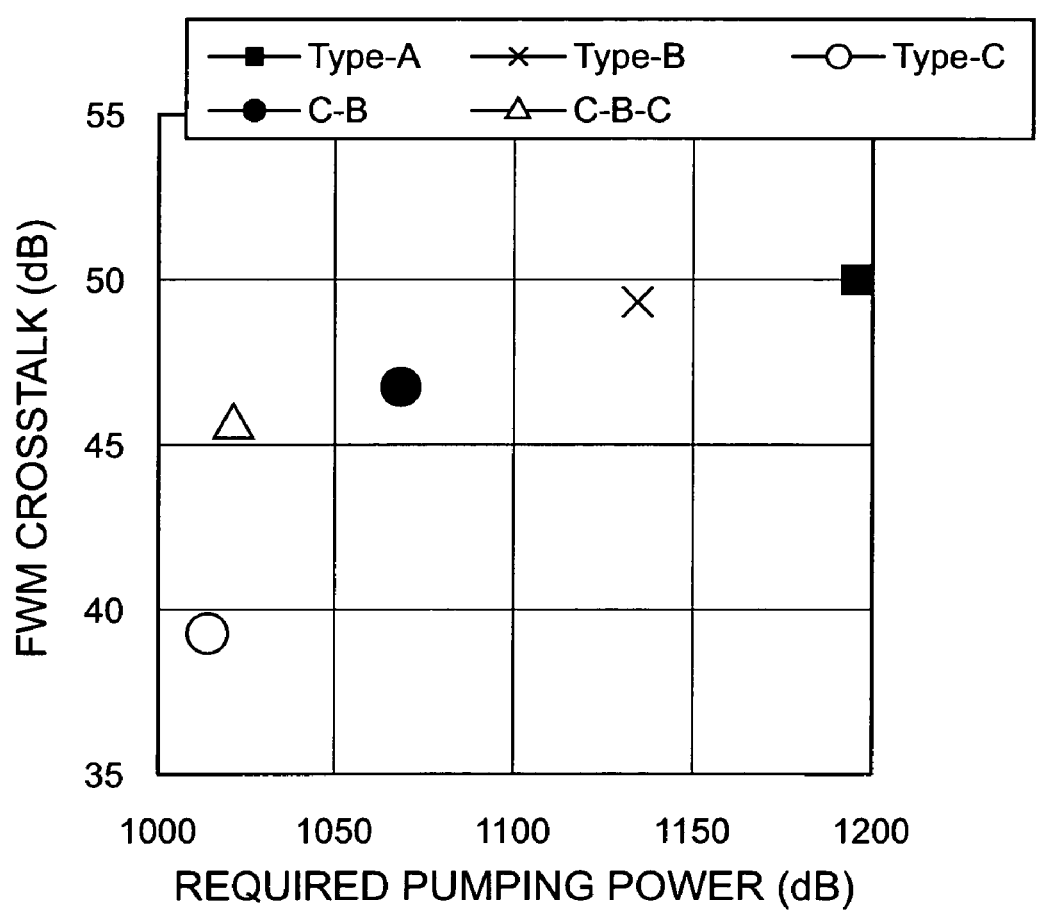
FIG. 18 is a graph showing a relation of FWM crosstalk (level difference between signal level and conjugate wave in the vicinity thereof) and required pumping power in the signal light output spectra shown in respective FIGS. 13 to 17.

FIG. 18 is a graph showing the relation between FWM crosstalk (level difference between signal level and level of its conjugate wave in the vicinity thereof) and required pumping power in each of the signal light output spectra shown in FIGS. 13 to 17. When compared with the EDF of type C, the required pumping power of the EDF of type B is about 0.4 dB higher, and the required pumping power of the EDF of type A is about 0.7 dB higher. An increase of the required pumping power in the bipartite configuration is only about 0.2 dB, and there is no significant difference of the pumping power in the tripartite configuration. The FWM crosstalk degrades in the tripartite configuration, but is still improved by 6 dB or more in comparison with the single configuration of the EDF of type C. It is seen from the above result that the use of the EDF of type B can achieve the improvement in the FWM crosstalk over 10 dB while constricting the increase of required pumping power to 0.4 dB, as compared with the case of the EDF of type C. Since the EDF of type C has $\eta_0$ smaller by about 2.5 dB than the conventional EDFs, suppression of $\eta_0$ is implemented by over 12 dB to cancel out the effect of halving $\Delta\lambda$.

The composite configurations of the multimode EDF and single-mode EDF(s) provide design with some freedom, and it is also feasible to find out a trade-off between PCE and FWM crosstalk according to use. The increase in the division number of EDFs as in the tripartite configuration will raise the problem of splice loss between EDFs. The ordinary fusion splice was adopted in the experiment to obtain the results of FIGS. 13 to 18, but in the as-spliced state a deviation between mode field diameters exists in each fusion-spliced portion. Therefore, it is more preferred to apply TEC (Thermally Expanded Core) splice or the like to reduce the difference between mode field diameters by heating the fusion-spliced portion.

Figure 19:
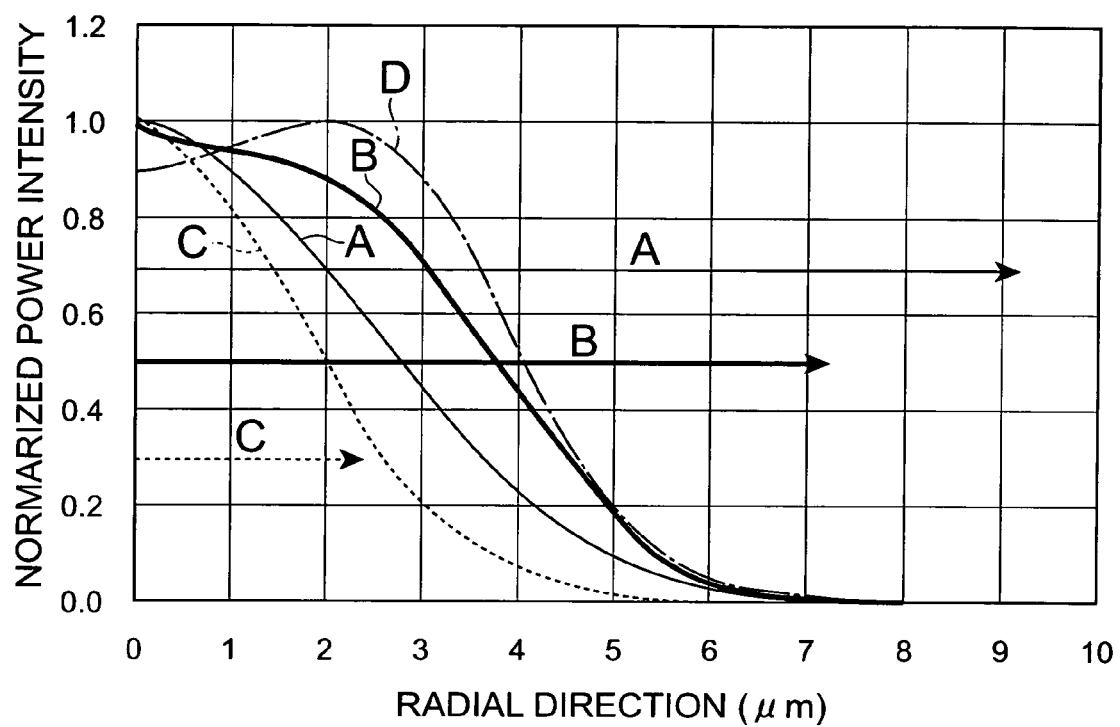
FIG. 19 is a graph showing mode fields and Er-doped regions of respective EDFs of types A to C.
Figure 20:
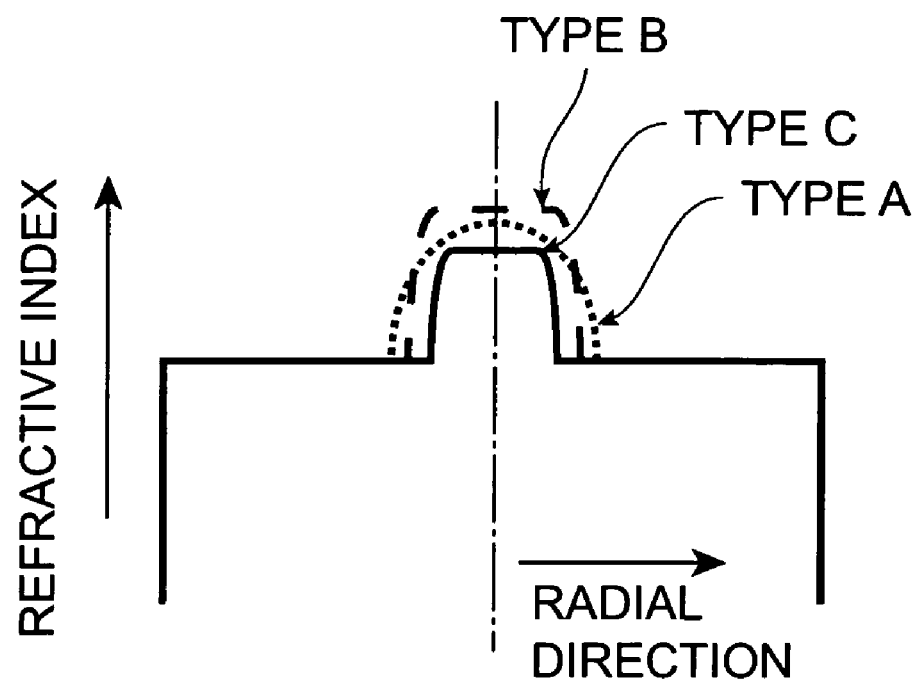
FIG. 20 is index profiles of the respective EDFs of types A to C.

Referring to FIG. 18, where the EDF of type A is used, PCE degrades without doubt, but the FWM crosstalk demonstrates little change as compared with the EDF of type B. This result contradicts the calculation result of mode field diameter (MFD) shown in the table of FIG. 2. Then we performed numerical calculation of the mode fields of the EDFs of types A to C. FIG. 19 is a graph showing the mode fields and Er-doped regions of the EDFs of types A to C. In this FIG. 19 lateral arrows indicate core diameters. FIG. 20 shows refractive index profiles of the respective EDFs of types A to C. The EDF of type A, having the index profile considerably convex near the center, demonstrated little mode spread, and had the mode field diameter smaller than that of the EDF of type B, despite the larger core diameter. This result is also supported by the fact that there is no big difference in the FWM suppression ratio between the EDF of type A and the EDF of type B as seen in FIG. 18.

The reason why PCE of the EDF of type A which should have the narrower mode field is worse than that of the EDF of type B is that the Er-doped region in the EDF of type A is much wider than the mode field diameter (only about 9 µm) and extends across the entire core region of the outer diameter of 18.4 µm, as apparent from FIG. 19. After all, there is the difference of almost double between the Er-doped region and the mode field diameter in the EDF of type A, and the Er-doped region so wide is of no use from the viewpoint of improvement in α based on increase of overlap between the Er-doped region and the signal light mode field. In the region 7 µm or more away from the core region, Er ever acts only as a simple absorber. This is the reason why the EDF of type A demonstrated the low PCE.

Figure 21:
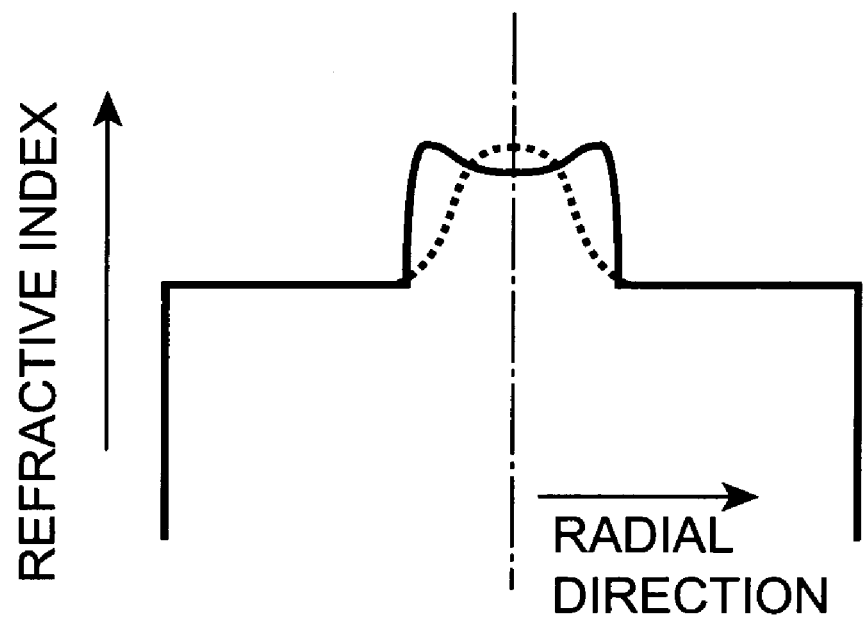
FIG. 21 is refractive index profiles of EDFs.

It is seen from the above that a desired index profile of EDF as an optical amplification fiber according to the present invention is one in which the refractive index becomes maximum at the position a predetermined distance away in the radial direction from the center of the fiber core, as indicated by a solid line in FIG. 21, in terms of mode field control. The mode field expectation in this case is indicated by a curve D in FIG. 19.

In the case of silica-based fiber, the refractive index increases with increase in the concentration of a dopant such as Ge or Al, and it is thus preferable that the dopant concentration of Ge or Al should reach a peak at the position the predetermined distance away in the radial direction from the center of the core. More preferably, the refractive index takes a minimum at the center of the core. On the other hand, the Er-doped region preferably overlaps the mode field neither too much nor too little, in order to avoid degradation of PCE as seen in the case of the EDF of type A. Namely, the outer diameter of the Er-doped region preferably does not exceed twice the mode field diameter for the signal light, as apparent from the result of the EDF of type A. From the viewpoint of PCE only, it is preferable to locally dope only the core center with Er, but in this case, it can cause a decrease in the value of α. Without going to such local doping, an Er dopant concentration profile of convex shape as indicated by a dotted line in FIG. 21 is duly useful in improvement in PCE. Selective doping with Ge or Al, which is carried out with such Er doping, can be implemented by MCVD to form the core by separate sooting steps of layers. The dopant may be supplied by liquid immersion, but can be supplied in vapor phase with better controllability.

However, in the case of the index profile as indicated by the solid line in FIG. 21, higher-order mode light becomes easier to excite, where the EDF is fusion-spliced with a single-mode fiber. It is thus necessary to pay attention to tolerable angles of cut of end faces or the like in fusion splice. This problem can be avoided by constructing an optical module 4 as shown in FIG. 22.

Figure 22:
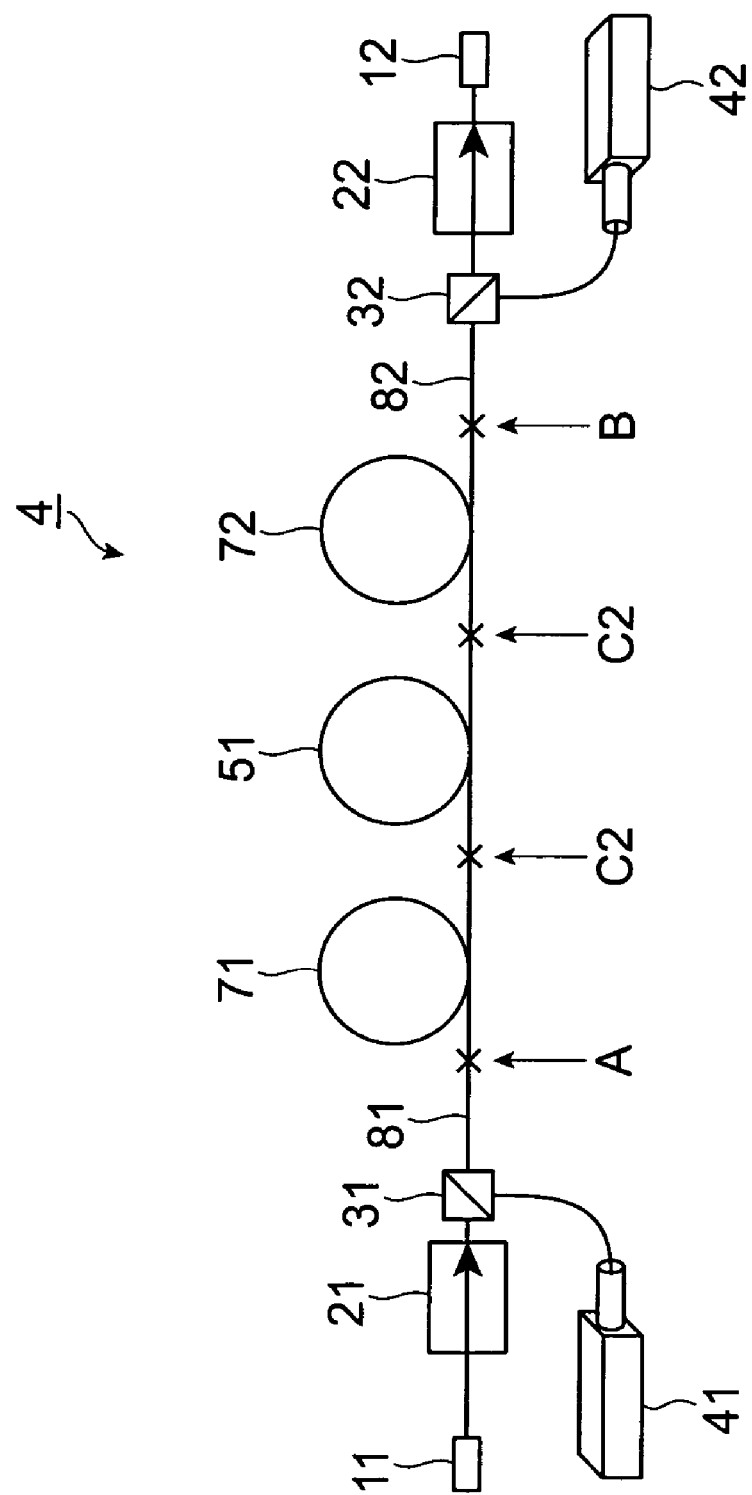
FIG. 22 is an illustration showing a configuration of a fourth embodiment of an optical amplification module according to the present invention.

FIG. 22 is an illustration showing a configuration of the fourth embodiment of the optical amplification module according to the present invention. The optical amplification module 4 of the fourth embodiment is different from the first embodiment in that a connection fiber 71 is provided on the light entrance end side of EDF 51 and a connection fiber 72 on the light exit end side of EDF 51. The EDF 51 has a refractive index profile of concave shape as indicated by the solid line in FIG. 21. The connection fibers 71, 72 are multimode optical fibers having a refractive index profile of convex shape as indicated by the dotted line in FIG. 21. The connection fiber 71 is inserted as a buffer between EDF 51 and single-mode fiber 81 as a connection terminal connected to WDM 31. The connection fiber 72 is inserted as a buffer between EDF 51 and single-mode fiber 82 connected to WDM 32. It is preferable that the core diameters of the respective connection fibers 71, 72 and EDF 51 be nearly equal to each other. The connection fibers 71, 72 do not have to be fibers for optical amplification in particular, but are more preferably fibers for optical amplification, because the insertion loss is reduced before arrival at the optical amplification fiber from the ordinary fiber.

Figure 23:
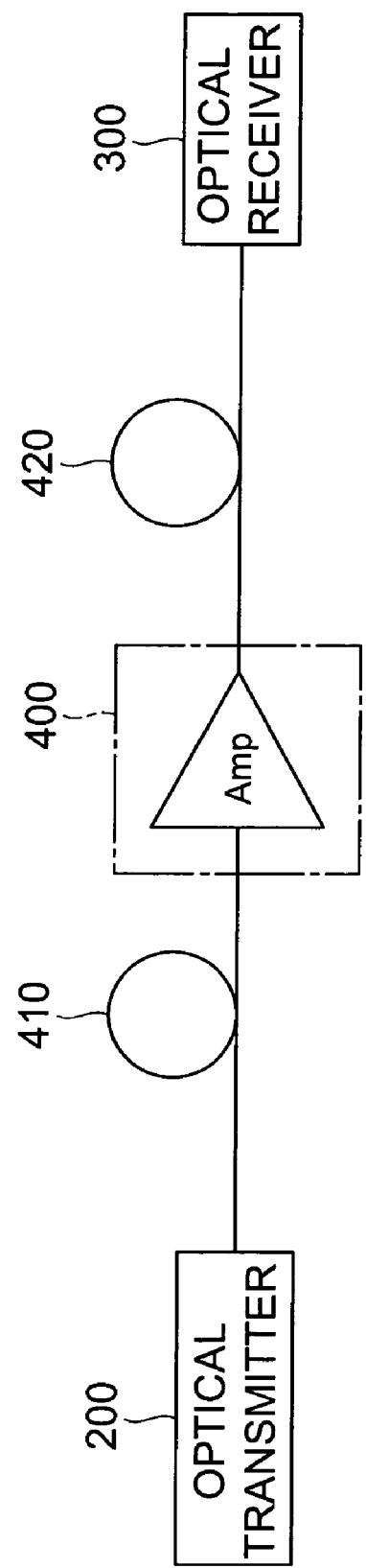
FIG. 23 is an illustration showing a configuration of an optical communication system according to the present invention.

The optical amplification module 1-4 having the structure as described above is applicable to an optical communication system, and the optical amplification module amplifies multiplexed signal light. FIG. 23 is an illustration showing a configuration of an optical communication system according to the present invention. Namely, the optical communication system has the configuration in which an optical amplification module 400 (equivalent to the optical amplification module 1-4 as described above) is placed as a repeater on a signal light transmission path comprising transmission fibers 410, 420 located between an optical transmitter 200 and an optical receiver 300. The multiplexed signal light containing multiple signal channels to be transmitted is preferably light in which the optical frequency spacing between two adjacent channels is 25 GHz or less. In this case, the signal light can also be transmitted with high quality while suppressing occurrence of FWM in the optical amplification module.

The present invention is by no means intended to be limited to the embodiments as described above, but can be modified in various ways. In the optical amplification fibers of the above embodiments the host glass was silica-based glass, but it may be, for example, tellurite glass or Bi-based glass or the like. Where the tellurite glass or Bi-based glass is applied as the host glass, it is effective in suppression of concentration extinction of Er, in spite of high nonlinearity. The amplification does not always have to be implemented by Er ions, but may be implemented by other rare-earth elements (e.g., Tm, Pr, etc.) or transition metal elements (e.g., Bi, Cr, etc.). Concerning such optical amplification fibers of new compositions, it is often difficult to produce them, and it is not always easy to implement the single-mode structure. By permitting the multimode structure as in the present invention, however, it becomes easy to produce the optical amplification fibers of new compositions as described herein.

The present invention effectively reduces the nonlinear interaction between signal channels even in transmission of multiplexed light containing multiple signal channels arranged in high density, and also effectively reduces the bending loss.

The optical amplification fiber according to the present invention is applicable to an optical amplification module capable of effectively reducing the nonlinear interaction between signal channels and also effectively reducing the bending loss, for example, in an optical communication system to transmit the multiplexed signal light containing multiple signal channels arranged in high density with the frequency spacing of 25 GHz or less.

It is apparent that the present invention can be modified in a variety of modification forms, from the above description of the present invention. Such modifications are not to be considered as departing from the spirit and scope of the present invention, and all improvements obvious to those skilled in the art are to be understood as embraced in the scope of claims which follow.

What is claimed is:

1. An optical amplification fiber configured for amplifying light, said optical amplification fiber, with respect to light at a wavelength of 1607 nm, having the following characteristics of:
a mode field diameter of 10 µm or more with respect to fundamental-mode light; and
a MAC number, defined by the ratio of the mode field diameter to a cutoff wavelength of said optical amplification fiber, of 6.8 or less with respect to the fundamental-mode light.

2. An optical amplification fiber according to claim 1, wherein said optical amplification fiber comprises an Er-doped region having an outer diameter larger than the mode field diameter but smaller than twice the mode field diameter.

3. An optical amplification fiber according to claim 1, wherein said optical amplification fiber comprises a core region having an outer diameter larger than the mode field diameter but smaller than twice the mode field diameter.

4. An optical amplification fiber according to claim 1, wherein, in an entire optical amplification band of said optical amplification fiber, the number of propagatable transverse modes at a light entrance end of said optical amplification fiber is 2 or more but 40 or less.

5. An optical amplification module for amplifying signal light inputted through an input end and for outputting the amplified signal light from an output end, comprising:
an optical amplification fiber according to claim 1, as a first optical amplification fiber constituting at least a part of a signal light propagation path located between the input end and the output end.

6. An optical amplification module according to claim 5, further comprising:
a second optical amplification fiber constituting at least a part of the signal light propagation path located between the input end and the output end, and having a cutoff wavelength shorter than the wavelength of 1607 nm with respect to the fundamental-mode light.

7. An optical amplification module according to claim 6, wherein said second optical amplification fiber is placed on the light entrance end side of said first optical amplification fiber.

8. An optical amplification module according to claim 6, wherein, said second optical amplification fiber comprises two optical amplification fibers one on the light entrance end side and the other on the light exit end side of said first optical amplification fiber.

9. An optical amplification module according to claim 6, wherein said second optical amplification fiber is an Er-doped optical fiber.

10. An optical amplification module according to claim 5, wherein a core region of said first optical amplification fiber has a refractive index profile with a maximum at a position a predetermined distance away in the radial direction from a center of said core region.

11. An optical amplification module according to claim 10, further comprising a connection fiber connected between said first optical amplification fiber and said second optical amplification fiber,
wherein a core region of said connection fiber has an outside diameter substantially equal to a core diameter of said first optical amplification fiber and has a refractive index profile with a maximum at a center of said core region.

12. An optical communication system for transmitting signal light of multiple channels in which an optical frequency spacing between mutually adjacent channels is 25 GHz or less, through a signal light transmission path, comprising:
an optical amplification module according to claim 5.

13. An optical amplification method of amplifying signal light by use of an optical amplification module according to claim 5,
wherein a total input power of the signal light into said first optical amplification fiber in said optical amplification module is set to be +10 dBm or more.

14. An optical amplification module according to claim 5, wherein said first optical amplification fiber is an Er-doped optical fiber.

15. An optical amplification module for amplifying signal light inputted through an input end and for outputting the amplified signal light from an output end, comprising:
   an optical amplification fiber according to claim 1, as a first optical amplification fiber constituting at least a part of a signal light propagation path located between the input end and the output end; and
   a single-mode fiber fusion-spliced to at least one of a light entrance end and a light exit end of said first optical amplification fiber.

16. An optical amplification module according to claim 15, wherein said first optical amplification fiber and said single-mode fiber are fusion-spliced to each other with a splice loss of 0.3 dB or less.

17. An optical amplification module according to claim 15, wherein a change of a splice loss between said first optical amplification fiber and said single-mode fiber is 0.2 dB or less in a temperature range of −5 to +65° C.

18. An optical amplification module according to claim 15, wherein said first optical amplification fiber and said single-mode fiber are fusion-spliced to each other under a condition that a product of a heating time and a heating power is equal to or smaller than a product of a heating time and a heating power in fusion splice between single-mode fibers.

19. An optical amplification module according to claim 18, wherein the heating time in fusion splice between said first optical amplification fiber and said single-mode fiber is approximately two thirds of the heating time in fusion splice between single-mode fibers.

20. An optical amplification module according to claim 15, wherein a crosstalk occurring at a fusion-spliced portion between said first optical amplification fiber and said single-mode fiber is 0.6% or less per spliced portion in terms of a power ratio.

21. An optical amplification module according to claim 15, wherein said single-mode fiber comprises two optical fibers fusion-spliced one to the light entrance end and the other to the light exit end of said first optical amplification fiber, and
   wherein a crosstalk between a light component, which is converted into a higher-order mode at the light entrance end of said first optical amplification fiber and which is converted into the fundamental mode at the light exit end, and a light component, which propagates through said first optical amplification fiber while maintaining the fundamental mode, is 45 dB or more in terms of a power ratio.

22. An optical amplification module for amplifying signal light inputted through an input end and for outputting the amplified signal light from an output end, comprising:
   an optical amplification fiber according to claim 1, as a first optical amplification fiber constituting at least a part of a signal light propagation path located between the input end and the output end;
   wherein said first optical amplification fiber has a length enough to earn an L-band flattened gain of 10 dB or more.

23. An optical amplification module according to claim 22, wherein said first optical amplification fiber has a length equivalent to provide an unsaturated absorption of 320 dB.

24. An optical amplification module for amplifying signal light inputted through an input end and for outputting the amplified signal light from an output end, comprising:
   an optical amplification fiber according to claim 1, as a first optical amplification fiber constituting at least a part of a signal light propagation path located between the input end and the output end;
   wherein said first optical amplification fiber has an unsaturated absorption peak per unit length of 17.2 dB/m or more.

* * * * *